(12) United States Patent
Ton et al.

(10) Patent No.: US 12,051,037 B2
(45) Date of Patent: Jul. 30, 2024

(54) METHODS, SYSTEMS, APPARATUSES, AND DEVICES FOR FACILITATING SAFE DELIVERIES OF PACKAGES

(71) Applicants: Huy Thatminh Ton, San Jose, CA (US); Winston That-Vu Ton, San Jose, CA (US); Antony That-Vu Ton, San Jose, CA (US)

(72) Inventors: Huy Thatminh Ton, San Jose, CA (US); Winston That-Vu Ton, San Jose, CA (US); Antony That-Vu Ton, San Jose, CA (US)

( * ) Notice: Subject to any disclaimer, the term of this patent is extended or adjusted under 35 U.S.C. 154(b) by 447 days.

(21) Appl. No.: 17/581,778

(22) Filed: Jan. 21, 2022

(65) Prior Publication Data

US 2023/0237426 A1  Jul. 27, 2023

(51) Int. Cl.
| | |
|---|---|
| *G06Q 10/0836* | (2023.01) |
| *G06N 20/00* | (2019.01) |
| *G06Q 10/0832* | (2023.01) |
| *H04L 9/08* | (2006.01) |
| *H04L 9/32* | (2006.01) |

(52) U.S. Cl.
CPC ......... *G06Q 10/0836* (2013.01); *G06N 20/00* (2019.01); *G06Q 10/0832* (2013.01); *H04L 9/0825* (2013.01); *H04L 9/3247* (2013.01)

(58) Field of Classification Search
CPC .. G06N 20/00; G06Q 10/083; G06Q 10/0832; G06Q 10/0836; H04L 9/0825; H04L 9/3247
See application file for complete search history.

(56) References Cited

U.S. PATENT DOCUMENTS

| | | | |
|---|---|---|---|
| 10,292,519 B1 | 5/2019 | Sutton | |
| 10,743,693 B2 | 8/2020 | Newcomb | |
| 2015/0199857 A1* | 7/2015 | Mackin | G07C 9/00896 340/5.26 |
| 2016/0099927 A1* | 4/2016 | Oz | G07C 5/0808 726/9 |
| 2018/0228311 A1 | 8/2018 | Bloom | |
| 2018/0297200 A1* | 10/2018 | Nakayama | B25J 9/1612 |

(Continued)

FOREIGN PATENT DOCUMENTS

WO  WO2020217662 A1  10/2020

*Primary Examiner* — Omer S Khan

(57) ABSTRACT

Disclosed herein is an apparatus for facilitating safe deliveries of packages. Accordingly, the apparatus comprises a container comprising an interior space and an opening leading into the interior space. Further, the apparatus comprises a sensor disposed on the container. Further, the sensor generates a first sensor data based on detecting a package identifier associated with a package and a second sensor data based on detecting a user identifier associated with a user. Further, the apparatus comprises a processing device communicatively coupled with the sensor. Further, the processing device analyzes the first sensor data, authenticates the package for disposing of the package in the interior space, generates a first command for allowing the disposing, analyzes the sensor data, authenticates the user, and generates a second command. Further, the apparatus comprises a locking mechanism operationally coupled with the door. Further, the locking mechanism transitions between a locked state and an unlocked state.

17 Claims, 21 Drawing Sheets

(56) References Cited

U.S. PATENT DOCUMENTS

2020/0390313 A1    12/2020  Pappas
2022/0097970 A1*    3/2022  Kiyokami ............. B60P 1/4421
2023/0100623 A1*    3/2023  Merheby ............. G07F 17/0092
                                                     705/39

* cited by examiner

METHODS, SYSTEMS, APPARATUSES, AND DEVICES FOR FACILITATING SAFE DELIVERIES OF PACKAGES

FIELD OF THE INVENTION

Generally, the present disclosure relates to the field of packages and containers for goods. More specifically, the present disclosure relates to methods, systems, apparatuses, and devices for facilitating safe deliveries of packages.

BACKGROUND OF THE INVENTION

The field of packages and containers for goods is technologically important to several industries, business organizations, and/or individuals. In particular, the use of packages and containers for goods is prevalent for facilitating safe deliveries of packages.

Porch Package Theft is a well-known and well-documented problem with severe economic consequences. Existing techniques for facilitating safe deliveries of packages are deficient with regard to several aspects. Current technologies available in the market include smart locks or smart garage openers that allow the shipping company to open doors or garages of the owner under the watchful eyes of a security camera, having the owner pick up at certain locations, allowing the owner to schedule a delivery time window or delivery boxes of various designs that can be opened with shared keys that can be coordinated through the use of apps. However, by using current technologies, the convenience of an owner is compromised if the owner has to work around a certain schedule or pick up at certain locations. Further, the privacy of the owner is not protected when the delivery person can access the inside of a home or garage, or see or even obtain possession of the owner's other delivered items. In some cases, the owner does not feel secure knowing that if the equipment is hacked, the access to their home is compromised. Furthermore, current technologies fall short of delivery signature since the shipping company does not have undeniable proof of delivery. The use of certain apps and the logistics to create and share keys make it complicated to use and limit the wide adoption, in some cases even to only one vendor.

Therefore, there is a need for improved methods, systems, apparatuses, and devices for facilitating safe deliveries of packages that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an apparatus for facilitating safe deliveries of packages, in accordance with some embodiments. Accordingly, the apparatus may include at least one container. Further, the at least one container may include at least one interior space and at least one opening leading into the at least one interior space. Further, the at least one container may be configured for storing at least one package in the at least one interior space. Further, the at least one container may include at least one door coupled with the at least one opening. Further, the at least one door may be transitionable between an open state and at least one closed state for openably closing the at least one opening. Further, the at least one door allows retrievably disposing of the at least one package in the at least one interior space through the at least one opening in the open state. Further, the at least one door prevents the retrievably disposing of the at least one package in the at least one interior space through the at least one opening in the at least one closed state. Further, the apparatus may include at least one sensor disposed on the at least one container. Further, the at least one sensor may be configured for generating at least one first sensor data based on detecting at least one package identifier associated with the at least one package. Further, the at least one first sensor data may include the at least one package identifier. Further, the at least one sensor may be configured for generating at least one second sensor data based on detecting at least one user identifier associated with at least one user. Further, the at least one user may be associated with the at least one package. Further, the at least one second sensor data may include the at least one user identifier. Further, the apparatus may include a processing device communicatively coupled with the at least one sensor. Further, the processing device may be configured for analyzing the at least one first sensor data. Further, the processing device may be configured for authenticating the at least one package for disposing of the at least one package in the at least one interior space based on the analyzing of the at least one first sensor data. Further, the processing device may be configured for generating at least one first command for allowing the disposing based on the authenticating of the at least one package. Further, the processing device may be configured for analyzing the at least one second sensor data. Further, the processing device may be configured for authenticating the at least one user for retrieving the at least one package from the at least one interior space based on the analyzing of the at least one second sensor data. Further, the processing device may be configured for generating at least one second command for allowing the retrieving based on the authenticating of the at least one user. Further, the apparatus may include at least one locking mechanism operationally coupled with the at least one door. Further, the at least one locking mechanism may be communicatively coupled with the processing device. Further, the at least one locking mechanism may be configured for transitioning between a locked state and an unlocked state. Further, the at least one locking mechanism allows transitioning of the at least one door from the at least one closed state to the open state in the unlocked state. Further, the at least one locking mechanism prevents the transitioning of the at least one door from the at least one closed state to the open state in the locked state. Further, the at least one locking mechanism may be configured for transitioning from the locked state to the unlocked state based on the at least one first command. Further, the at least one locking mechanism may be configured for transitioning from the locked state to the unlocked state based on the at least one second command.

Further, in some embodiments, the processing device may be configured for determining at least one delivery event based on at least one of the detecting of the at least one package identifier, the detecting of the at least one user identifier, the generating of the at least one first command, and the generating of the at least one second command. Further, the processing device may be configured for generating a delivery message of the at least one delivery event based on the determining of the at least one delivery event. Further, the apparatus may include a communication device communicatively coupled with the processing device. Further, the communication device may be configured for transmitting the delivery message to at least one user device.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
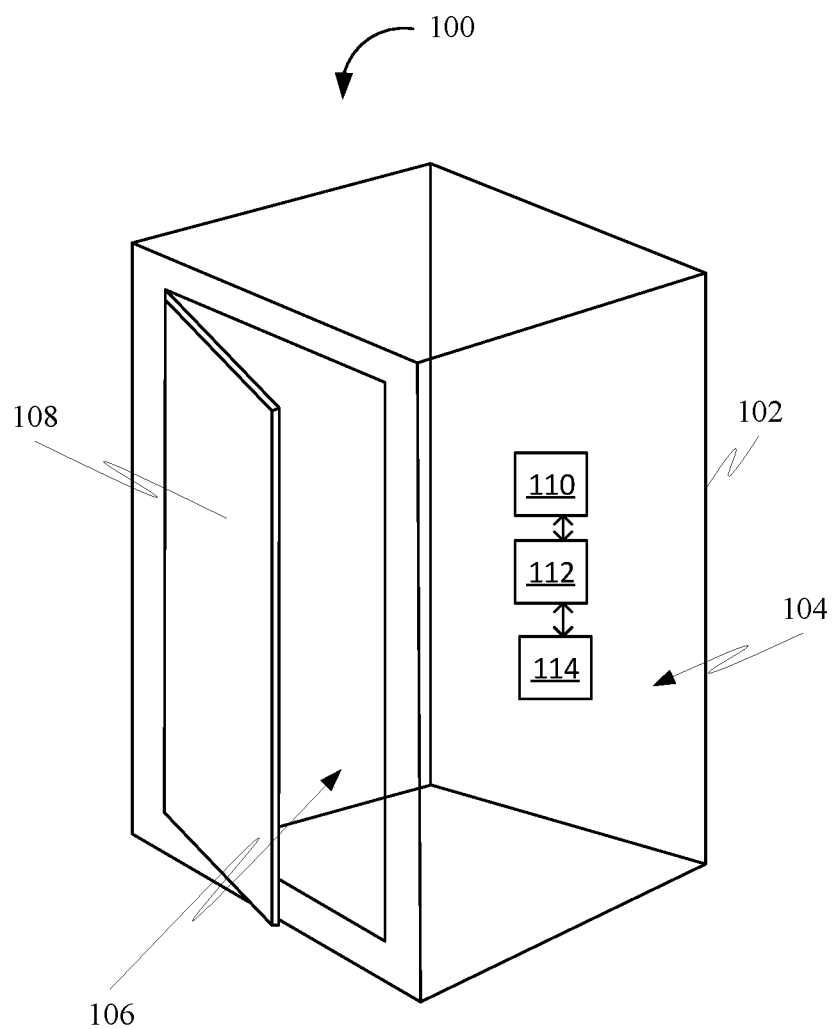
FIG. 1 is a schematic of an apparatus for facilitating safe deliveries of packages, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating safe deliveries of packages, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a raspberry pi, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data finger-printing, role-based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. sound, etc.) associated with a device corresponding to the performance of the one or more steps, physical state of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.) and a biometric sensor (e.g. a fingerprint sensor) associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives.

Overview:

The present disclosure describes methods, systems, apparatuses, and devices for facilitating safe deliveries of packages. Further, the disclosed device (or an apparatus) may accept parcel deliveries in such a way that ensures its contents are safe from theft and vandalism, provides traceability, and protects the owner's privacy.

Further, the disclosed system may use a parcel tracking number, bar code, QR code, RFID chip, or other information attached by a shipper on the outside of the packaging box, as a one-time key to unlocking a parcel delivery door. This eliminates the need to share keycode and/or to grant access to the shipping company and avoids any logistic and coordination complexities associated with sharing keys, use of apps, keypads, etc.

For single-family residences, the device uses two separate doors. Further, a first door of the two separate doors is a one-way delivery door used by a delivery person that protects the owner's privacy and a second door of the two separate doors is a separate access door that the owner can use to retrieve the delivered contents. This describes a reusable key that the owner generates to open an access door to retrieve contents. This reusable key is an added feature for security so that the owner does not have to carry a physical key in person, thereby, reducing the chances of key loss.

Further, the device may include an optional security camera that performs photo and video recording triggered by motion around the device (or device unit). It describes a method of sending text and email notifications of activities such as opening and closing of various doors and the tracking information of the items associated with such activities. Further, the device can use a public/private pair key to generate delivery signatures. Further, the device may be associated with an online interface as well as WIFI capability and Ethernet access ports to access and manage. For multi-family complexes, the device may be associated with a method of clustering multiple device units together to manage to change capacity requirements, a method to share the use of the device units, to protect residents' privacy, and a system of online management.

To protect the owner's privacy, the device for single-family residence features 2 locked doors. Further, the first door of the 2 locked doors includes a delivery door that may be a one-way door i.e. once unlocked, the delivery person may drop items in, but cannot take them out, or even peer inside. The one-way feature can be simply accomplished with a baffle or a turn-style door with a light filter to prevent visibility from outside. The rest of the owner's delivered items are protected, not only from theft but also from curious eyes. The delivery door may only be unlocked with a delivery key described below.

Further, a second door of the 2 locked doors may be an access door for the owner to access and retrieve his/her delivered items. The access door may be unlocked either with a physical key or a softkey, called the access key, which is a QR code, a barcode, or an RFID that can be read using the same or similar sensor that is used for delivery as described below. Since most owners may store the softkey as an image in a phone, it enjoys the additional benefits of being protected by the phone's security. With the softkey, the owner does not need to carry in person a physical key, minimizing the chance of key loss.

Further, all doors are equipped with LED status lights that indicate their lock status.

Further, a delivery key used for delivery is the information readily available on the outside of the packaging material, i.e. the tracking barcode or QR code. This eliminates the need for the delivery companies to use an app, nor do they have to deal with the logistics of obtaining a key from the owner. This makes the device immediately available for use by any shipping company. To make the solution even more secure, the delivery key is a one-time key that is automatically destroyed after it has been used to open the delivery door.

Since the delivery key is the tracking number, the owner does not have to generate the delivery key. However, the owner needs to download the delivery key into a device to make it aware of the expected delivery. This will be done via an online interface.

Further, an access key may be one used by the owner to retrieve the delivered items. The access key can be reused as many times as the owner desires. Further, the access key may be changed by the owner at any time. This flexibility has several benefits. The owner enjoys the convenience of not having to change the access key unless necessary. The owner may give a key to a friend to pick up items during vacation and change them once he/she is back home. The owner can change the access key once in a while for added security.

Similar to the delivery key, the access key may be downloaded to the device via the online interface. However, for security reasons, for the first-time setup, the owner needs to use a physical key to access the inside.

Further, the device may include one or more cameras. Further, a first camera of one or more cameras may be used for scanning the delivery key to open the delivery door. There's no need to talk to, enter a key, or signal the disclosed device in any other way to start the scanning process. The first camera may be always on the lookout for a code to match against its list of expected keys.

Further, the disclosed device may include a second optional camera for an added security measure. This is for homes that do not have their security camera. The second camera may look for motion and record photos and/or video when it detects motions in the device's surroundings. This gives the owner added peace of mind. Further, the second camera helps the owner check that the shipping company drops off properly, and helps collect evidence of vandalism and/or theft attempts which may be provided to law enforcement and insurance companies. Further, the disclosed device may include a third optional camera located internally inside the device to verify package drop-off for delivery signing purposes. Further, the device may include a micro SD card and SSD drive. Further, the device may include a monitor (video display screen) that give visual instructions and aid with scanning. Further, the device may receive a power supply using a power plug, cord, power adapter, and a battery. Further, the device may include an LED, cameras, ethernet Port, GPIO ports, electric wires and cables, USB port, HDMI port, Wi-Fi chip, an antenna, a step motor, CPU, a GPU, a circuit board, a memory (RAM), a microSD card slot, a heat sink, an air vent, a fan, buttons, an enclosure (the 'box' itself), hinges, a lock, a hook (for chaining, bolting), and doors. Further, the device may include a one-way trap, baffle, or turnstile mechanism.

Further, the online interface provides a simple and ubiquitous method that the owner can use to manage the device. Further, the online interface provides password-protected access to a web page from within the owner's home local area network (LAN). Alternatively, the online interface may also be implemented on a server running in the cloud. These interfaces allow the user to download recorded photos and videos, upload delivery keys for expected deliveries and optional information for each delivery such as the name of the seller, description of an item, and order number, enable options for each delivery such as to generate signature upon delivery, update access key and optional key expiration date, update key related security settings such as several failed attempts before certain actions happen, download activities: time of each delivery, time of each opening, closing off access doors, time of each opening, closing of a delivery door, and tracking number(s) involved in each event, and update owner contact information such as name, address, phone number, and email. Further, the disclosed device may be associated with a notification profile. Further, the device may be associated with Wi-Fi network information, such as encryption algorithm, SSID, and password.

Further, multiple notifications are provided via email and/or text to: owner's provided phone number, and in some cases, to the shipping company's provided contact, e.g. for delivery signature. Further, notifications may be provided when delivery is made, when repeated failed attempts are made to unlock the delivery door or access door, when a delivery key is created or deleted from the device when the access key is deleted, or modified when the access door is disabled due to repeated failed attempts to unlock with the wrong access key, and when continuous motions are detected near the device's surroundings indicating vandalism attempt. All notifications may be enabled, disabled, and configured with thresholds.

Further, the device may be associated with a network interface that may be the pieces of hardware that allow the owner to connect to the device via the online interface. Further, the device may be associated with a Wi-Fi interface and Ethernet interface. For security reasons, the WIFI interface is disabled from the factory, and can only be enabled during the initial setup when the owner opens the access door with the physical key and accesses the inside. Further, the ethernet interface associated with the device is only accessible from inside the device, i.e. with the access door open. This is for security reasons. Further, the device may include a mechanism to factory reset, that may wipe out all information, including the W-Fi configurations, restoring its factory settings.

Further, the disclosed device implements a delivery with a signature method for delivering items to Single Family Residences. Further, buyers request signatures for the delivery when they don't want to risk the loss of items if the items are dropped off unattended. With the signatures, the shipping company is required to hand the parcel directly to the owner. The signature is proof that the shipping company has made the drop to a person. Further, the disclosed device allows shipping companies to drop off securely. If the device is full and the device cannot accept the package, no signature is generated. Also, the device will not indicate that the device has accepted the package. Further, the shipping company might still drop off outside the device, but surely this cannot be considered delivery with signature. The implementation of the signature requires providing evidence to the shipping company that the shipping company may use as proof that delivery was made into the device. Further, the device implements different signatures having different levels of rigor. Further, the device allows the owner to choose from multiple digital signatures of different strengths. Further, one way of the digital signatures is a simple signature. In, the simple signature, a label is placed on the inside of the delivery door, which is visible when the door is unlocked and opened. The owner can write on this label a name, initial, or anything else he/she chooses to be used as a signature. The delivery person can take a photo of this as evidence. Further, another way of the digital signatures is an email signature. In the email signature, the owner can choose to upload the shipping company's email or phone number together with the tracking information. Further, an email/text may be sent to that contact as proof. This email may contain the order specifics such as tracking number, drop-off time, address, etc. Further, another way of the digital signatures is an email with a photo. If the owner chooses to have the internal camera, the photo of the inside of the device, after the parcel has been accepted and the door locked, may be taken, and sent with the acknowledgment email as evidence. Further, another way of the digital signature is a signed email with a photo. Further, the signed email with the photo has the highest level of rigor in all of the digital signatures. In the signed email with the photo, the email is signed using private/public key pair technology. This guarantees the email cannot be modified. In this scheme, the private key, which the owner keeps private to himself and securely loads into the device, is used to generate a signature, which is a sequence of otherwise seemingly random bytes on a body of the message. When the drop-off is made, the device may use the private key to generate a unique signature computed over the item's tracking number, the time of day when the delivery happens, and a digest of a photo of the inside of the device. This photo and the digest may be described later. Then the device texts/emails it to both the shipping company and the owner as proof of delivery. The shipping company is provided with the owner's public key beforehand. This can be done by the owner during the purchase process if he/she requires delivery with signature. With the public key, and the signed message, the shipping company can prove that the rest of the message is authentic, i.e. it is signed by the owner, that the tracking number matches, the time matches, and digest matches, and that nothing in the message is altered in any way. This proves undeniably that the package delivery was made. In case the Wi-Fi interface associated with the device is broken, the device cannot send text or email, therefore, it won't be able to send signatures to the shipping company. In such scenarios, the camera may be disabled to prevent delivery from happening. This is similar to the situation when a physical signature cannot be obtained when no one is home to sign. An array of LED lights and a camera inside the device may recognize that the item has been dropped off successfully before the signature is sent. The generation of the private/public key pair is accomplished via the online interface and only needs to be done once upon initial setup, although it can be changed if the owner desires.

Further, the device may include an internal camera and LED array. Before the device generates a signature to the shipping company, the device needs to ensure that a drop was made successfully. Further, the device may include an array of LEDs to create light for the photo. Before the delivery door is opened, the LED turns on, and the internal camera takes a photo of the device's current internal content. After the delivery door is closed, another photo is taken. The two snapshots are compared, and the signature is generated only if the differences between the snapshots show the addition of an object shaped as a package. A digest, e.g. MD5, of the second photo is then computed, which is used as part of the message to be signed. The reason for signing the digest of the photo, rather than signing the photo itself, is that the photo is a big file, while the digest computed from the photo is very small, but it ensures that if the photo is modified, the digest will also change significantly.

Further, the device may be associated with a lock and a bolt. Without being secured, this device, in its entirety, can be stolen. This is the equivalent of a thief stealing a safe without even attempting to unlock it. This device has loops, slots, and holes that facilitate chaining or bolting to immobile objects such as posts, trees, fences, etc. but the specific design of chaining, bolting, locking mechanism is not part of this invention.

Residents of multi-family complexes have the need for protection of privacy that is not met by the current often used practice of holding parcels for the whole building complex in a common room. Further, the device for single-family units is modified for the multi-family situation, since there is not enough space to keep one device for every family in the complex. Further, the multiple device units are easily clustered together to be managed and operated as a single system. This allows the building owner or manager to expand and reduce capacity as needed. Further, a system, in this clustered configuration, is shared by all residents in the complex. Any unit can be used to hold delivery by any resident. Shared units are not dedicated to a single person. Further, each unit receives only one item at a time. After an item is delivered inside, the device may change its status to occupied, and can no longer accept any more delivery until the content is picked up. Therefore, if a resident has multiple deliveries, each one will be delivered in a separate unit. Not every device unit has a scanning camera. Instead, one single scan camera is shared among all units in a system. There's no need to enter a tracking number per item into the system to expect delivery. Instead, to unlock and open a unit, the delivery person makes a two-step process. First, the delivery person scans his shipping company's reusable code which the complex manager entered into the system upon setup. Next, the delivery person scans the tracking number. Now, an unoccupied unit may unlock and open, and the system will remember which tracking number is assigned to that unit. Since each device unit may hold only one delivery, there's no need for a separate access door or the one-way door feature. Instead, there is only one door for each device unit, used both for delivery and pick-up purposes. Zero, one, or more security cameras can be shared in a system. Each resident in the complex will be given a different reusable key. The combination of the resident's reusable key and the tracking number is needed to pick up. When a resident scans both keys, the right unit, where the item with the matching tracking number was deposited, may unlock and open. Further, management of the system via online access is performed only by a complex owner or manager. It allows the complex owner to generate/delete/modify keys, checks status of the units, manage addition and removal of device units, check metrics such as number and frequency of deliveries, a historical graph of unit occupancy, etc., access logs comprising timestamps of delivery made, pickups made, etc., access photo & video recordings, and generate Private/Public Key for each resident for signature purpose. Further, separate profiles can be loaded one for each resident. Each profile contains at least a name, room number, contact (email, phone). Further, a notification profile may be similar to the ones for a single-family solution.

Further, the device may operate on the python programming language and language interpreter, and a cloud storage is associated with the device. Further, the online interface may be used for the configuration and management of the device. In the multi-residence solution, in an instance, Wi-fi may be used to link the devices together rather than connecting with physical wires.

The device may be associated with a safe delivery inbox. When packages are delivered, thieves can steal from the owner's porch. Further, the device (or delivery inbox) comes with 2 cameras. Further, a first camera of the 2 cameras may scan the code (QR or barcode) that the vendor, seller, online marketplace, or shipment company generates. The code is affixed to the package, or the delivery person can have the code on a handheld device. One example of such a code is the shipping tracking number. The delivery inbox (or inbox) unlocks itself when the code is scanned successfully. Further, a security baffle on the inbox prevents the delivery person from taking items out of the inbox after it's unlocked. The inbox closes and locks by itself after the delivered item is put inside. Further, thieves cannot open the box without the code. The owner may open a separate main access door by scanning another (owner's) code on the same camera. This allows the owner to retrieve the delivered items.

When the delivery inbox is scanned & opened, closed, and locked, text messages are sent to one or more phone numbers that the owner previously registered. Further, a delivery code is generated per item/purchase and can be used to open only once, while the owner's code can be reused or changed at any time by the owner. Further, a $2^{nd}$ camera of the 2 cameras on the inbox performs as a security camera that captures images/videos when the $2^{nd}$ camera detects motion, or when it detects significant events such as inbox opened, unlocked, etc. The inbox is managed over the internet. Further, the codes can be downloaded to/deleted from the device over the internet. The inbox is connected to the internet via Wi-Fi and is password protected. The owner may manage phone numbers, video, images, passwords, etc.

The inbox may be also manually unlocked/locked by the owner's hard key—a traditional hardware key that is used to override and access internal components to perform a factory reset, first-time setup, etc. Further, the inbox (or safe delivery inbox) may prevent package theft.

Referring now to figures, FIG. 1 is a schematic of an apparatus 100 for facilitating safe deliveries of packages, in accordance with some embodiments. Accordingly, the apparatus 100 may include at least one container 102. Further, the at least one container 102 may include at least one interior space 104 and at least one opening 106 leading into the at least one interior space 104. Further, the at least one container 102 may be configured for storing at least one package in the at least one interior space 104. Further, the at least one package may include an item, an object, an article, a product, etc. Further, the at least one container 102 may include at least one door 108 coupled with the at least one opening 106. Further, the at least one door 108 may be transitionable between an open state and at least one closed state for openably closing the at least one opening 106. Further, the at least one door 108 allows retrievably disposing of the at least one package in the at least one interior space 104 through the at least one opening 106 in the open state. Further, the at least one door 108 prevents the retrievably disposing of the at least one package in the at least one interior space 104 through the at least one opening 106 in the at least one closed state.

Further, the apparatus 100 may include at least one sensor 110 disposed on the at least one container 102. Further, the at least one sensor 110 may include a camera, a microphone, a motion sensor, etc. Further, the at least one sensor 110 may be configured for generating at least one first sensor data based on detecting at least one package identifier associated with the at least one package. Further, the detecting of the at least one package identifier may include capturing the at least one package identifier, recording the at least one package identifier, scanning the at least one package identifier, etc. Further, the at least one package identifier may be unique to the at least one package. Further, the at least one package identifier may include a QR code, package sipping information, a package number, package information, a key, etc. Further, the at least one first sensor data may include the at least one package identifier. Further, the at least one sensor 110 may be configured for generating at least one second sensor data based on detecting at least one user identifier associated with at least one user. Further, the at least one user identifier may be unique to the at least one user. Further, the at least one user identifier may include user information, an access key, a user's image, a user's voice, a user's biometric, etc. Further, the at least one user may be associated with the at least one package. Further, the at least one second sensor data may include the at least one user identifier.

Further, the apparatus 100 may include a processing device 112 communicatively coupled with the at least one sensor 110. Further, the processing device 112 may be configured for analyzing the at least one first sensor data. Further, the processing device 112 may be configured for authenticating the at least one package for disposing of the at least one package in the at least one interior space 104 based on the analyzing of the at least one first sensor data. Further, the processing device 112 may be configured for generating at least one first command for allowing the disposing based on the authenticating of the at least one package. Further, the processing device 112 may be configured for analyzing the at least one second sensor data. Further, the processing device 112 may be configured for authenticating the at least one user for retrieving the at least one package from the at least one interior space 104 based on the analyzing of the at least one second sensor data. Further, the processing device 112 may be configured for generating at least one second command for allowing the retrieving based on the authenticating of the at least one user.

Further, the apparatus 100 may include at least one locking mechanism 114 operationally coupled with the at least one door 108. Further, the at least one locking mechanism 114 may be communicatively coupled with the processing device 112. Further, the at least one locking mechanism 114 may be configured for transitioning between a locked state and an unlocked state. Further, the at least one locking mechanism 114 allows transitioning of the at least one door 108 from the at least one closed state to the open state in the unlocked state. Further, the at least one locking mechanism 114 prevents the transitioning of the at least one door 108 from the at least one closed state to the open state in the locked state. Further, the at least one locking mechanism 114 may be configured for transitioning from the locked state to the unlocked state based on the at least one first command. Further, the at least one locking mechanism 114 may be configured for transitioning from the locked state to the unlocked state based on the at least one second command.

Figure 2:
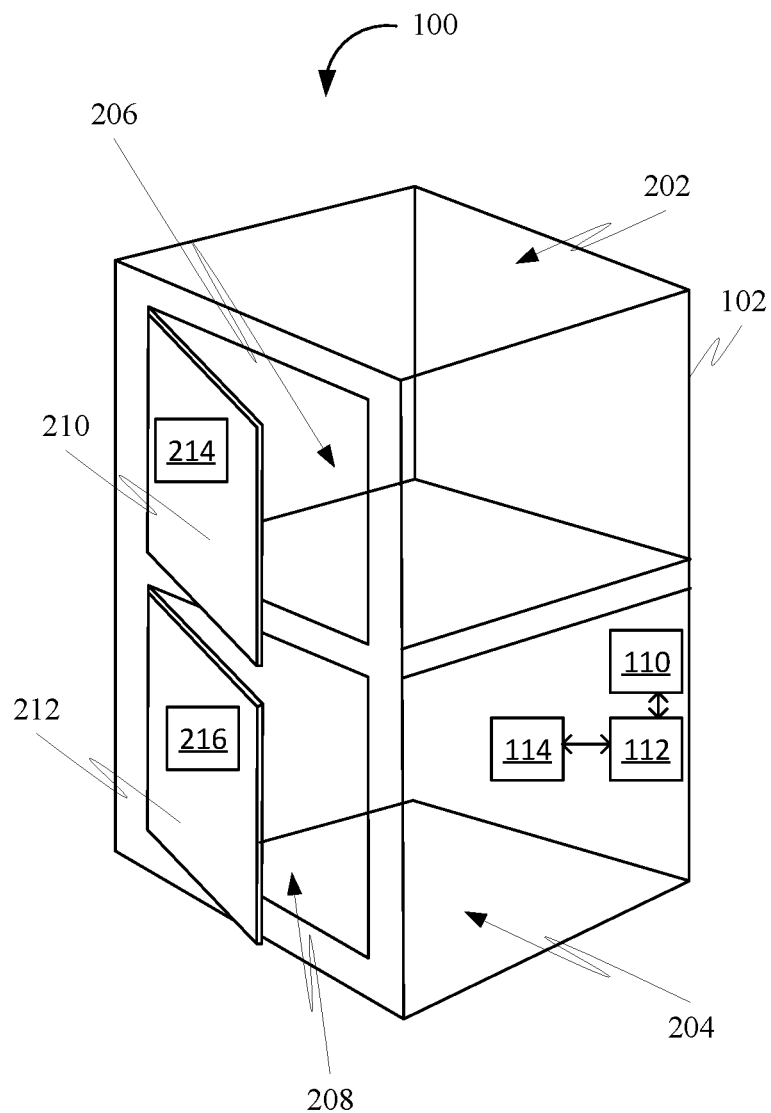
FIG. 2 is a schematic of the apparatus for facilitating safe deliveries of packages, in accordance with some embodiments.

Further, in some embodiments, the at least one interior space 104 may include a first interior space 202 (as shown in FIG. 2) and a second interior space 204 (as shown in FIG. 2). Further, the at least one opening 106 may include a first opening 206 (as shown in FIG. 2) leading into the first interior space 202 and a second opening 208 (as shown in FIG. 2) leading into the second interior space 204. Further, the at least one door 108 may include a first door 210 (as shown in FIG. 2) coupled with the first opening 206 and a second door 212 (as shown in FIG. 2) coupled with the second opening 208. Further, the first door 210 may be transitionable between the open state and the at least one closed state for openably closing the first opening 206 and the second door 212 may be transitionable between the open state and the at least one closed state for openably closing the second opening 208. Further, the first door 210 allows disposing of the at least one package in the first interior space 202 through the first opening 206 in the open state. Further, the first door 210 prevents the disposing of the at least one package in the first interior space 202 through the first opening 206 in the at least one closed state. Further, the second door 212 allows retrieving of the at least one package from the second interior space 204 through the second opening 208 in the open state. Further, the second door 212 prevents the retrieving of the at least one package in the second interior space 204 through the second opening 208 in the at least one closed state. Further, the at least one locking mechanism 114 may include a first locking mechanism 214 (as shown in FIG. 2) and a second locking mechanism 216 (as shown in FIG. 2). Further, the first locking mechanism 214 may be operationally coupled with the first door 210 and the second locking mechanism 216 may be operationally coupled with the second door 212. Further, the first locking mechanism 214 transitions from the locked state to the unlocked state based on the at least one first command and the second locking mechanism 216 transitions from the locked state to the unlocked state based on the at least one second command.

Figure 3:
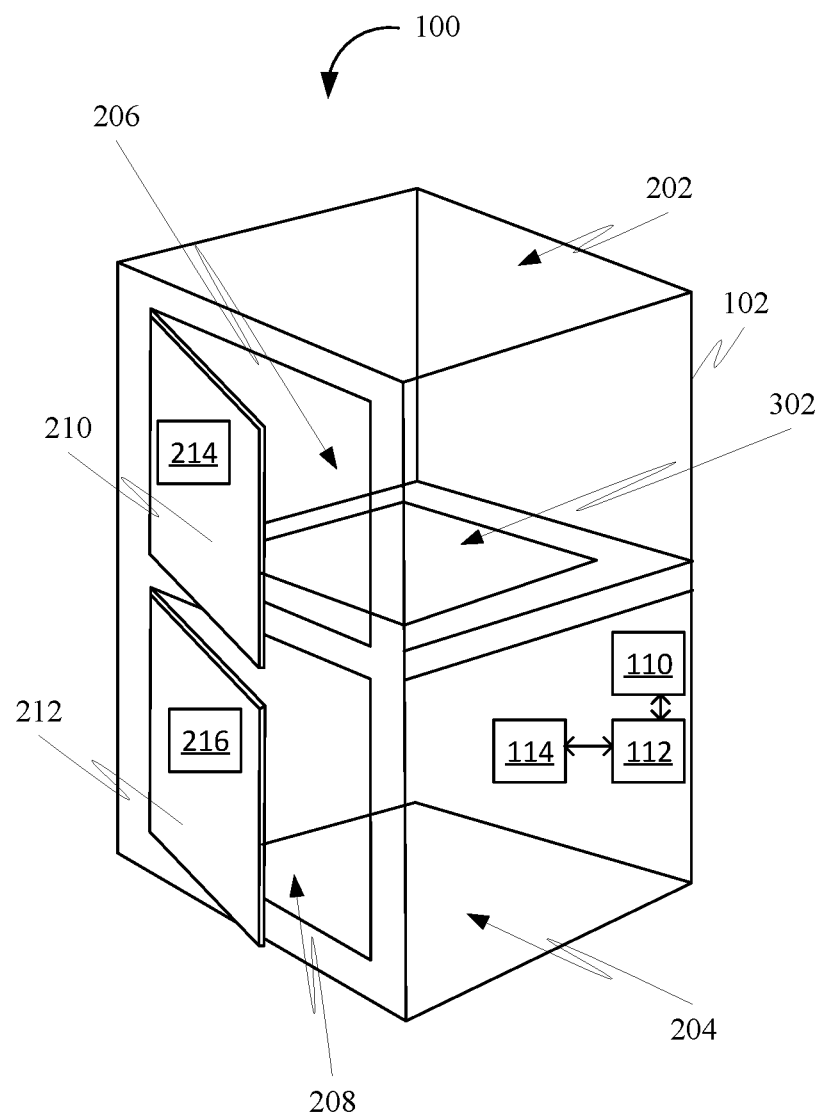
FIG. 3 is a schematic of the apparatus for facilitating safe deliveries of packages, in accordance with some embodiments.

Further, in some embodiments, the at least one container 102 may include an inner opening 302 (as shown in FIG. 3). Further, the first interior space 202 may be coupled with the second interior space 204 through the inner opening 302. Further, the at least one package disposed in the first interior space 202 may be transferred to the second interior space 204 through the inner opening 302. Further, the first interior space 202 may be accessible through the first opening 206 for allowing the disposing of the at least one package into the first interior space 202 through the first opening 206 in the open state. Further, the second interior space 204 may be inaccessible from the first opening 206 for preventing the retrieving of the at least one package from the second interior space 204 through the first opening 206 in the open state.

Figure 4:
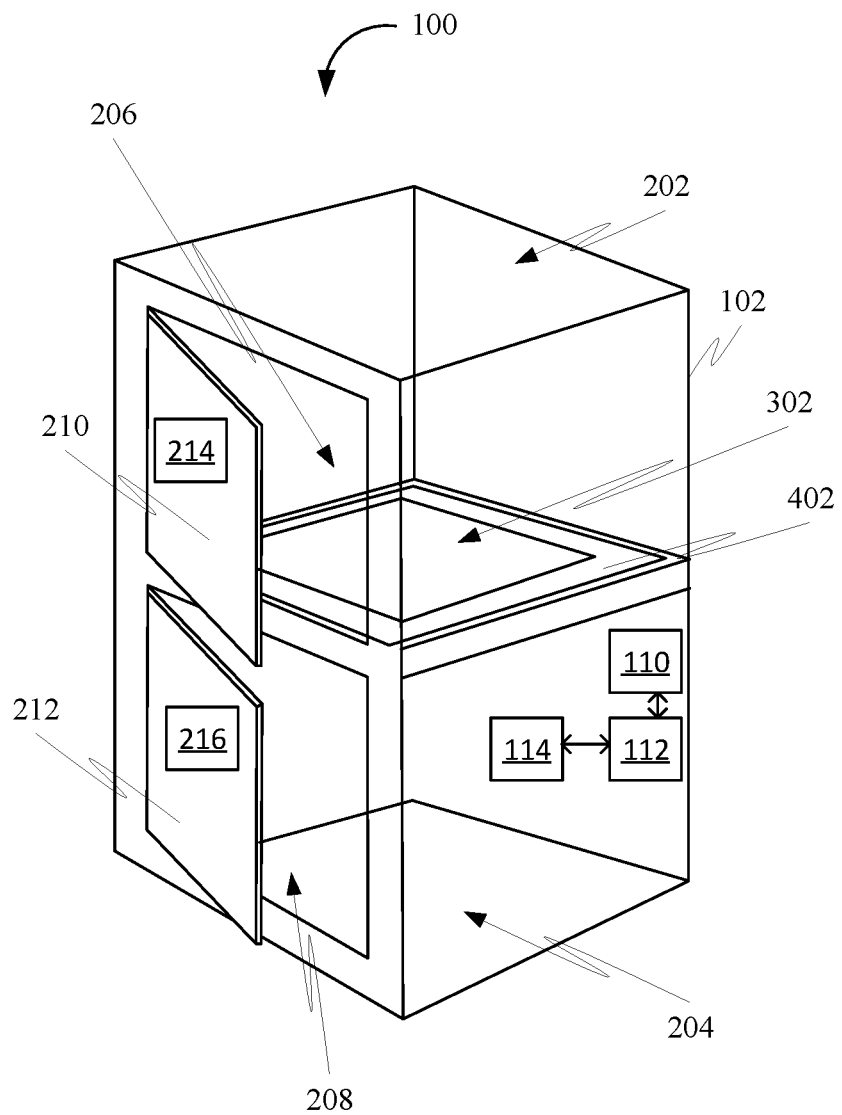
FIG. 4 is a schematic of the apparatus for facilitating safe deliveries of packages, in accordance with some embodiments.

In further embodiments, the apparatus 100 may include an inner door 402 (as shown in FIG. 4) configured for transitioning between a closed door state and at least one open door state for openably closing the inner opening 302 based on transitioning the first door 210 between the open state and the at least one closed state. Further, the inner door 402 transitions from the at least one open door state to the closed door state for closing the inner opening 302 based on the transitioning of the first door 210 from the at least one closed state to the open state for restricting an access to the second interior space 204 from the first interior space 202 through the inner opening 302. Further, the preventing of the retrieving of the at least one package from the second interior space 204 through the first opening 206 in the open state may be based on the restricting of the access to the second interior space 204 from the first interior space 202 through the inner opening 302.

Figure 5:
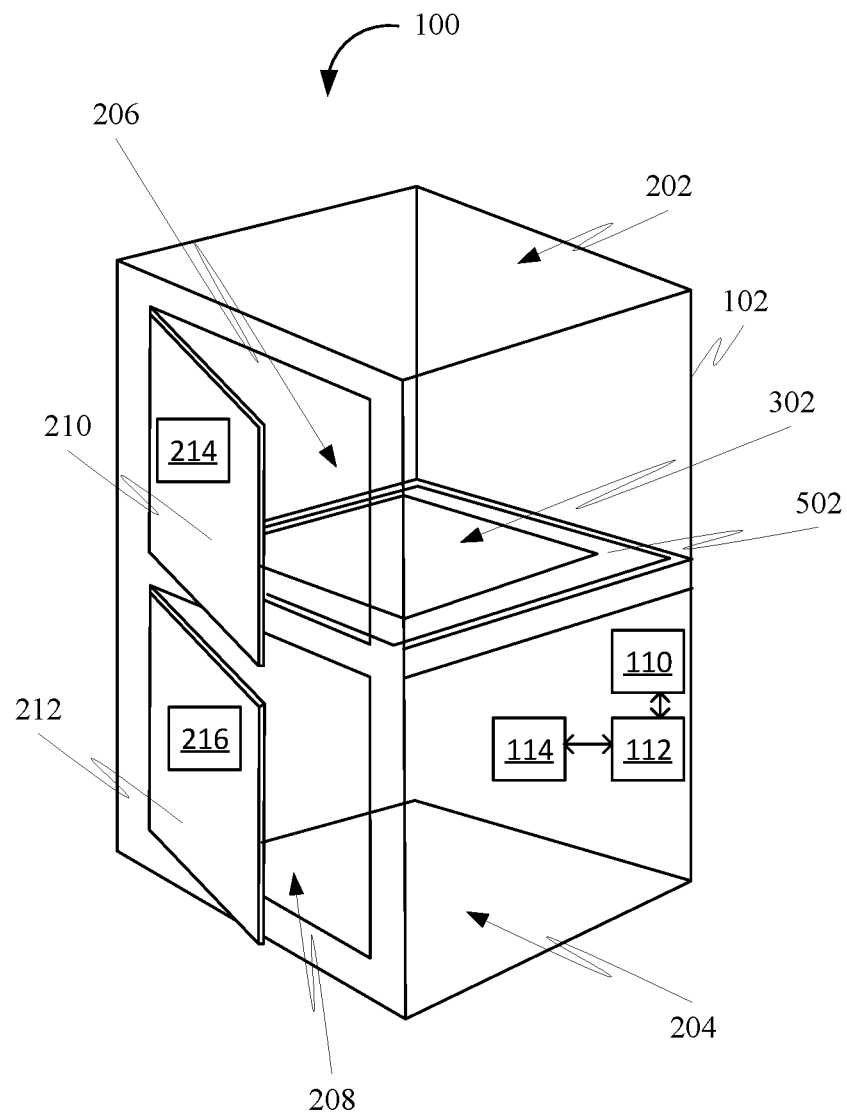
FIG. 5 is a schematic of the apparatus for facilitating safe deliveries of packages, in accordance with some embodiments.

In further embodiments, the apparatus 100 may include a light blocking member 502 (as shown in FIG. 5) comprised in the inner door 404. Further, the light blocking member 502 may include an opaque panel, etc. Further, the light blocking member 502 may be configured for blocking a visibility of the second interior space 204 through the inner opening 302 from the first interior space 202.

Figure 6:
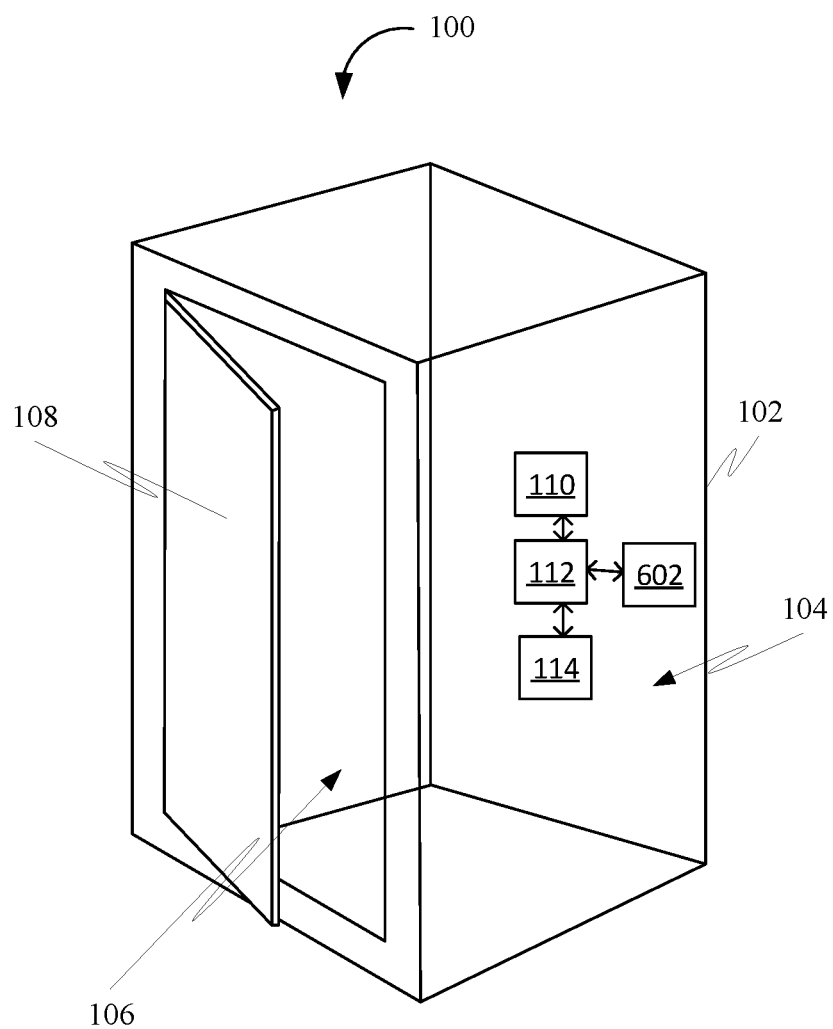
FIG. 6 is a schematic of the apparatus for facilitating safe deliveries of packages, in accordance with some embodiments.

In further embodiments, the apparatus 100 may include a storage device 602 (as shown in FIG. 6) communicatively coupled with the processing device 112. Further, the storage device 602 may be a cloud storage device. Further, the storage device 602 may be configured for retrieving at least one authorized package identifier associated with at least one authorized package expected to be delivered using the apparatus 100 based on the analyzing of the at least one first sensor data. Further, the at least one authorized package may include an item, an article, a product, etc. Further, the at least one authorized package identifier uniquely identifies the at least one authorized package. Further, the at least one authorized package identifier may include a QR code, package sipping information, a package number, package information, a key, etc. Further, the processing device 112 may be configured for comparing the at least one package identifier with the at least one authorized package identifier. Further, the processing device 112 may be configured for determining a match between the at least one package identifier and the at least one authorized package identifier based on the comparing. Further, the authenticating of the at least one package may be based on the determining of the match between the at least one package identifier and the at least one authorized package identifier.

Further, in some embodiments, the retrieving of the at least one authorized package identifier associated with the at least one authorized package may include retrieving the at least one authorized package identifier associated with the at least one authorized package from a distributed ledger.

Figure 7:
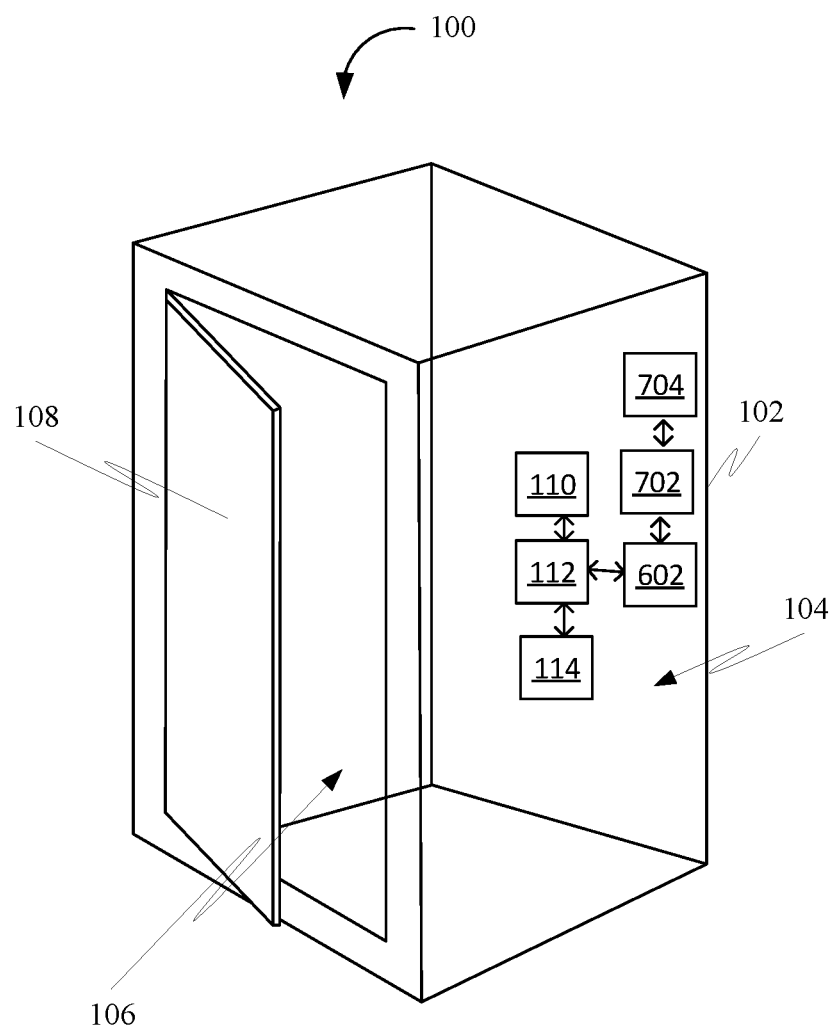
FIG. 7 is a schematic of the apparatus for facilitating safe deliveries of packages, in accordance with some embodiments.

In further embodiments, the apparatus 100 may include a communication device 702 (as shown in FIG. 7) communicatively coupled with the storage device 602. Further, the communication device 702 may be configured for receiving the at least one authorized package identifier associated with the at least one authorized package from at least one first device 704 (as shown in FIG. 7). Further, the at least one first device 704 may include a computing device, etc. Further, the storage device 602 may be configured for storing the at least one authorized package identifier associated with the at least one authorized package. Further, the retrieving of the at least one authorized package identifier associated with the at least one authorized package may be based on the storing.

Figure 8:
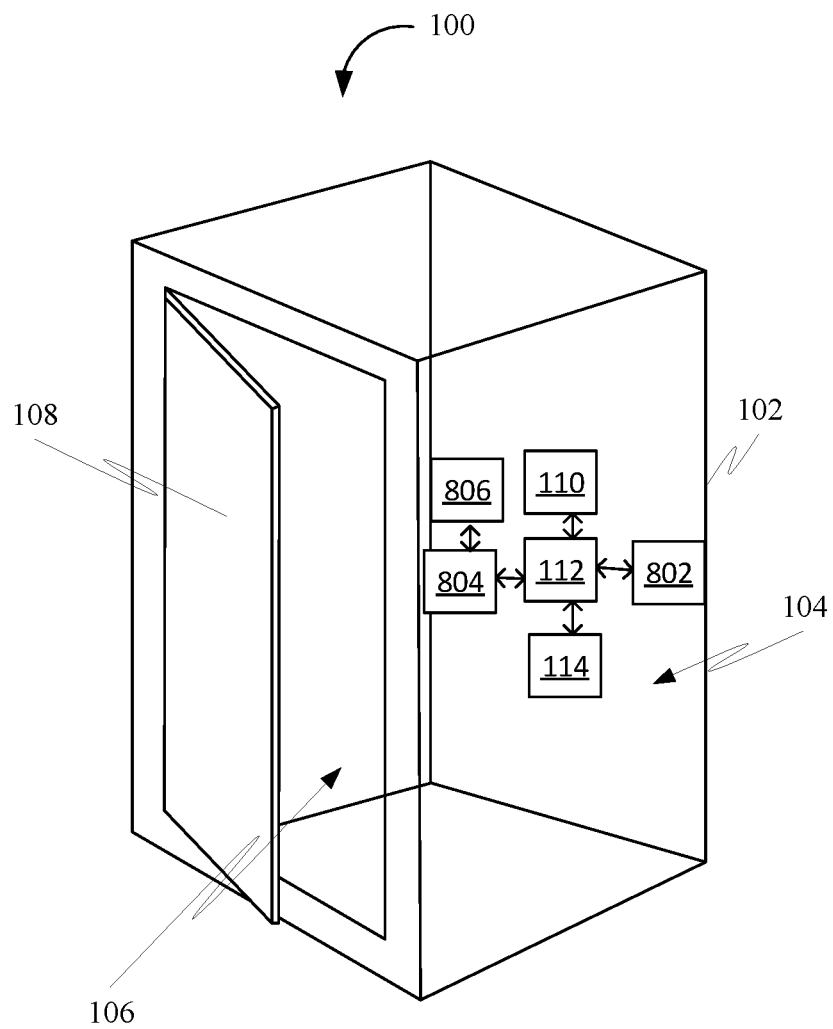
FIG. 8 is a schematic of the apparatus for facilitating safe deliveries of packages, in accordance with some embodiments.

In further embodiments, the apparatus 100 may include at least one monitoring device 802 (as shown in FIG. 8) disposed on the at least one container 102. Further, the at least one monitoring device 802 may include a camera, a microphone, a motion sensor, etc. Further, the at least one monitoring device 802 may be configured for generating at least one monitoring data based on monitoring at least one object present in a vicinity of the apparatus 100. Further, the at least one object may include an individual, an item, a vehicle, etc. Further, the processing device 112 may be communicatively coupled with the at least one monitoring device 802. Further, the processing device 112 may be configured for analyzing the at least one monitoring data using at least one machine learning model. Further, the processing device 112 may be configured for determining at least one event associated with the apparatus 100 based on the analyzing of the at least one monitoring data. Further, the at least one event may include an occurrence of a tampering activity, an occurrence of a suspicious activity, a presence of a suspicious person, a presence of a suspicious object, etc. Further, the processing device 112 may be configured for generating at least one alert of the at least one event based on the determining of the at least one event. Further, the at least one alert may include the at least one event. Further, the apparatus 100 may include a communication device 804 (as shown in FIG. 8) communicatively coupled with the processing device 112. Further, the communication device 804 may be configured for transmitting the at least one alert and the at least one monitoring data to at least one second device 806 (as shown in FIG. 8). Further, the at least one second device 806 may include a computing device, etc.

Figure 9:
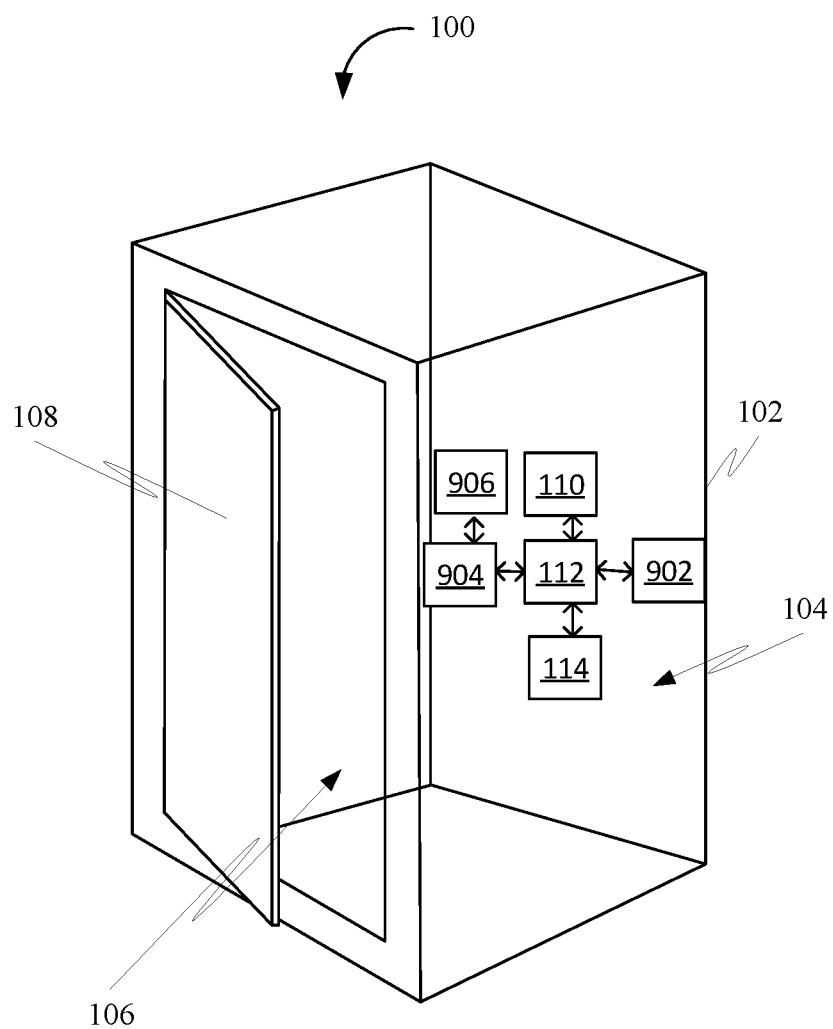
FIG. 9 is a schematic of the apparatus for facilitating safe deliveries of packages, in accordance with some embodiments.

Further, in some embodiments, the processing device 112 may be configured for generating at least one authentication information associated with an authentication of the at least one user based on the authenticating of the at least one user. Further, the at least one authentication information may include an apparatus accessing attempt, a success of the apparatus accessing attempt, a failure of the apparatus accessing attempt, etc. Further, the processing device 112 may be communicatively coupled with a storage device 902 (as shown in FIG. 9). Further, the storage device 902 may be configured for storing the at least one authentication information.

Further, in some embodiments, the storage device 902 may be configured for retrieving at least one historical authentication information associated with at least one historical authentication of the at least one user. Further, the at least one historical authentication information may include a historical apparatus accessing attempt, a historical success of the apparatus accessing attempt, a historical failure of the apparatus accessing attempt, etc. Further, the processing device 112 may be configured for analyzing the at least one authentication information and the at least one historical authentication information using at least one first machine learning model. Further, the processing device 112 may be configured for determining at least one authenticating event associated with the at least one user based on the analyzing of the at least one authentication information and the at least one historical authentication information. Further, the at least one authenticating event may include a successful authentication, an unsuccessful authentication, a threshold number of the unsuccessful authentication, etc. Further, the processing device 112 may be configured for generating at least one authenticating alert of the at least one authenticating event based on the determining of the at least one authenticating event. Further, the at least one authenticating alert may include the at least one authenticating event. Further, the processing device 112 may be communicatively coupled with a communication device 904 (as shown in FIG. 9). Further, the communication device 904 may be configured for transmitting the at least one authenticating alert to at least one third device 906 (as shown in FIG. 9). Further, the at least one third device 906 may include a computing device.

Figure 10:
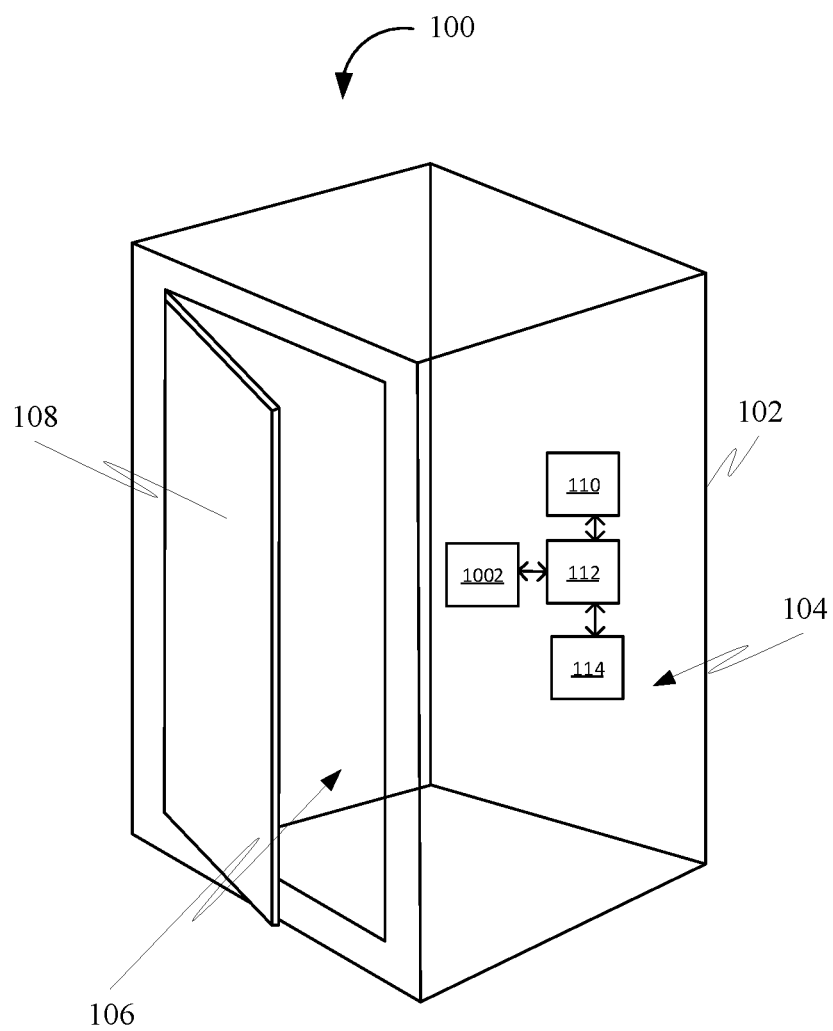
FIG. 10 is a schematic of the apparatus for facilitating safe deliveries of packages, in accordance with some embodiments.

In further embodiments, the apparatus 100 may include a storage device 1002 (as shown in FIG. 10) communicatively coupled with the processing device 112. Further, the storage device 1002 may be configured for retrieving at least one authorized user identifier associated with at least one authorized user based on the analyzing of the at least one second sensor data. Further, the processing device 112 may be configured for comparing the at least one user identifier with the at least one authorized user identifier. Further, the processing device 112 may be configured for determining a match between the at least one user identifier and the at least one authorized user identifier based on the comparing of the at least one user identifier with the at least one authorized user identifier. Further, the authenticating of the at least one user may be based on the determining of the match between the at least one user identifier and the at least one authorized package identifier.

Figure 11:
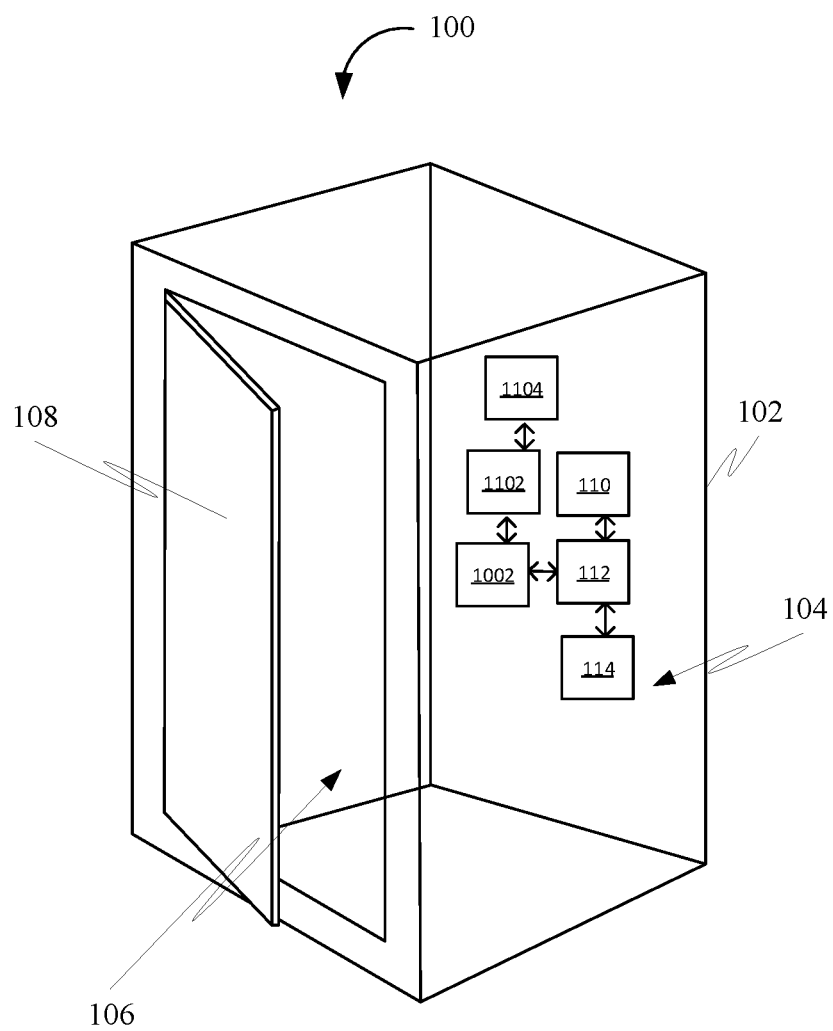
FIG. 11 is a schematic of the apparatus for facilitating safe deliveries of packages, in accordance with some embodiments.

In further embodiments, the apparatus 100 may include a communication device 1102 (as shown in FIG. 11) communicatively coupled with the storage device 1002. Further, the communication device 1102 may be configured for receiving the at least one authorized user identifier associated with the at least one authorized user from at least one fourth device 1104 (as shown in FIG. 11). Further, the at least one fourth device 1104 may include a computing device. Further, the storage device 1002 may be configured for storing the at least one authorized user identifier associated with the at least one authorized user. Further, the retrieving of the at least one authorized user identifier associated with the at least one authorized user may be based on the storing of the at least one authorized user identifier.

Figure 12:
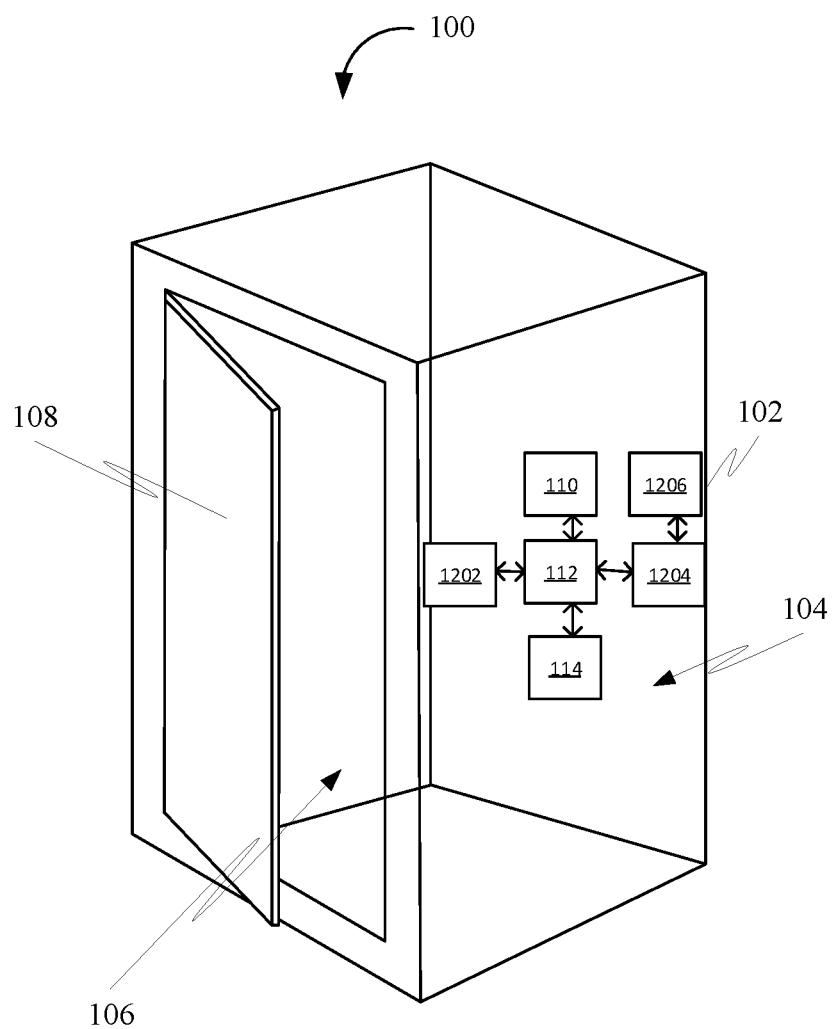
FIG. 12 is a schematic of the apparatus for facilitating safe deliveries of packages, in accordance with some embodiments.

In further embodiments, the apparatus 100 may include at least one third sensor 1202 (as shown in FIG. 12) disposed on the at least one container 102. Further, the at least one third sensor 1202 may be configured for generating at least one third sensor data associated with the at least one container 102. Further, the at least one third sensor 1202 may include a camera, a microphone, a motion sensor, a weight sensor, etc. Further, the processing device 112 may be communicatively coupled with the at least one third sensor 1202. Further, the processing device 112 may be configured for analyzing the at least one third sensor data. Further, the processing device 112 may be configured for determining a presence of the at least one package in the at least one interior space 104 based on the analyzing of the at least one third sensor data. Further, the processing device 112 may be configured for generating a message of a delivery of the at least one package based on the determining of the presence of the at least one package. Further, the apparatus 100 may include a communication device 1204 (as shown in FIG. 12) communicatively coupled with the processing device 112. Further, the communication device 1204 may be configured for transmitting the message to at least one fifth device 1206 (as shown in FIG. 12). Further, the at least one fifth device 1206 may include a computing device.

Further, in some embodiments, the processing device 112 may be configured for signing the message of the delivery digitally using a private key associated with the at least one user. Further, the private key may be associated with a private and public key pair. Further, the processing device 112 may be configured for generating a digitally signed message of the delivery based on the signing of the message. Further, the digitally signed message may be accessible by a public key of the private and public key pair. Further, the communication device 1204 may be configured for transmitting the digitally signed message to the at least one fifth device 1206.

Figure 13:
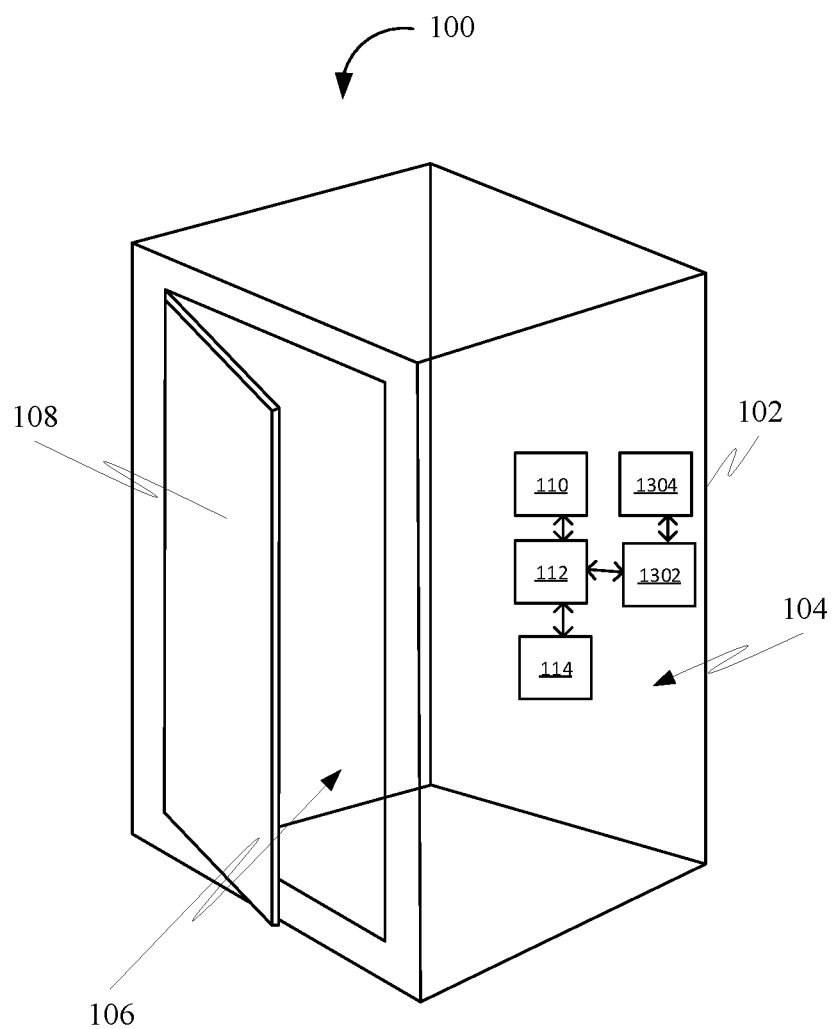
FIG. 13 is a schematic of the apparatus for facilitating safe deliveries of packages, in accordance with some embodiments.

Further, in some embodiments, the processing device 112 may be configured for determining at least one delivery event based on at least one of the detecting of the at least one package identifier, the detecting of the at least one user identifier, the generating of the at least one first command, and the generating of the at least one second command. Further, the processing device 112 may be configured for generating a delivery message of the at least one delivery event based on the determining of the at least one delivery event. Further, the processing device 112 may be communicatively coupled with a communication device 1302 (as shown in FIG. 13). Further, the communication device 1302 may be configured for transmitting the delivery message to at least one user device 1304 (as shown in FIG. 13).

Figure 14:
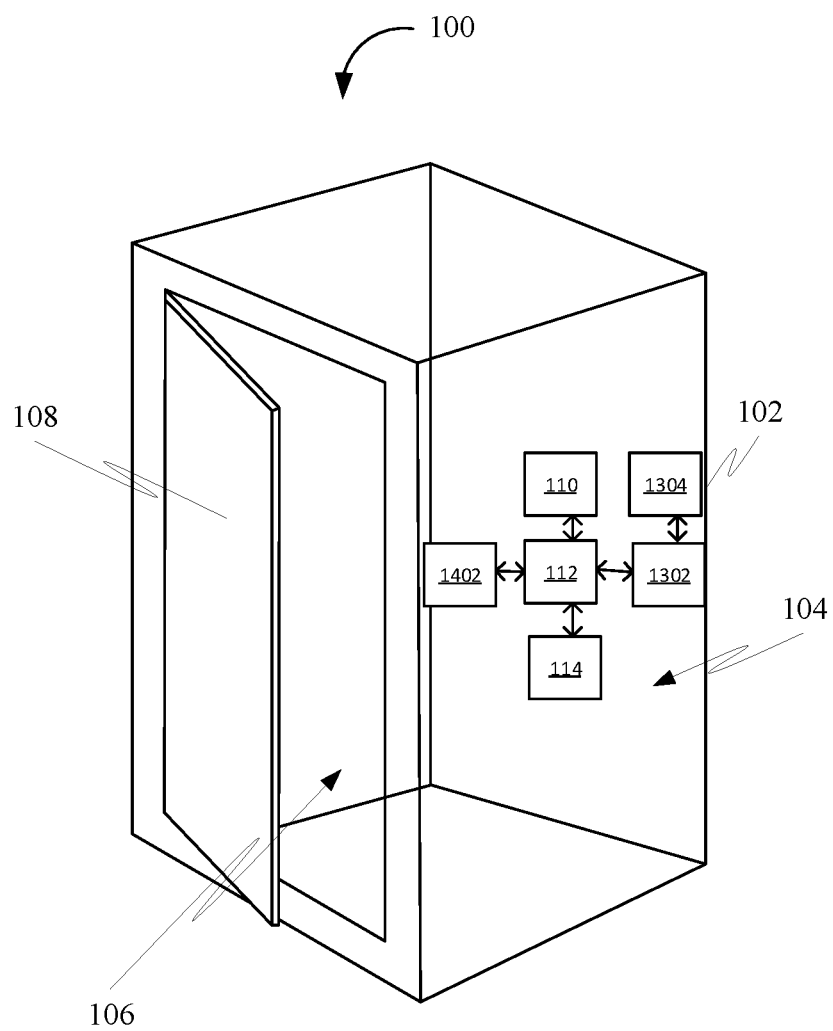
FIG. 14 is a schematic of the apparatus for facilitating safe deliveries of packages, in accordance with some embodiments.

In further embodiments, the apparatus 100 may include at least one fourth sensor 1402 (as shown in FIG. 14) disposed on the at least one container 102. Further, the at least one fourth sensor 1402 may be configured for generating at least one fourth sensor data based on detecting at least one communication operation of the communication device 1302. Further, the at least one communication operation may include a transmitting function, a receiving function, a communication establishing function, etc. Further, the processing device 112 may be communicatively coupled with the at least one fourth sensor 1402. Further, the processing device 112 may be configured for analyzing the at least one fourth sensor data. Further, the processing device 112 may be configured for determining a status of the communication device 1302 based on the analyzing of the at least one fourth sensor data. Further, the processing device 112 may be configured for generating at least one sensor command for the at least one sensor 110 based on the determining of the status. Further, the at least one sensor 110 may be configured for transitioning from an enabled state to a disabled state based on the at least one sensor command. Further, at least one of the detecting of the at least one package identifier associated with the at least one package and the detecting of the at least one user identifier associated with at least one user may be performed in the enabled state. Further, at least one of the detecting of at least one package identifier associated with the at least one package and the detecting of the at least one user identifier associated with at least one user may be not performed in the disabled state.

Figure 15:
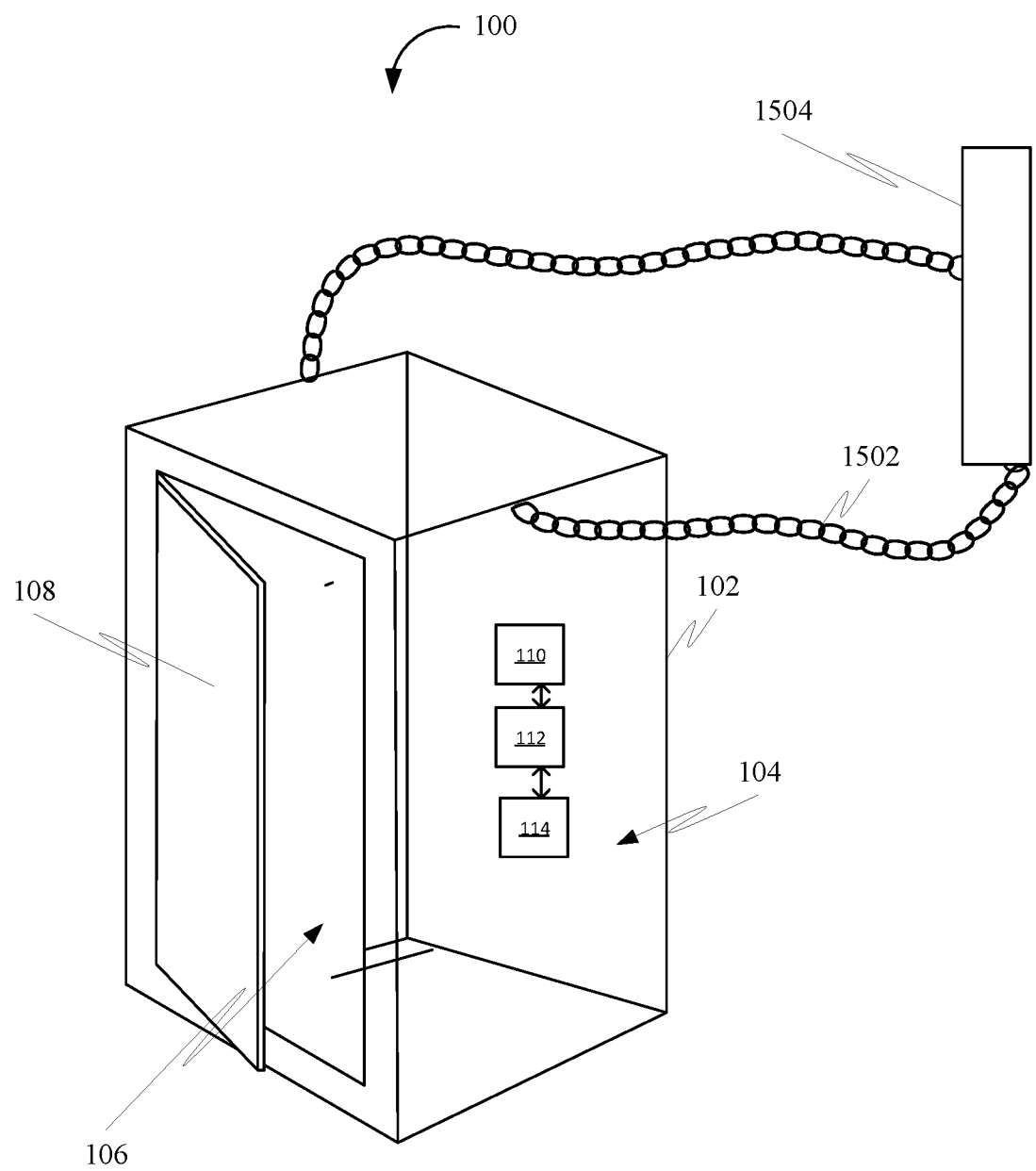
FIG. 15 is a schematic of the apparatus for facilitating safe deliveries of packages, in accordance with some embodiments.

In further embodiments, the apparatus 100 may include at least one securing element 1502 (as shown in FIG. 15) attached to the at least one container 102. Further, the at least one securing element 1502 may be configured for securing the apparatus 100 to at least one immobile object 1504 (as shown in FIG. 15). Further, the at least one securing element 1502 may include a chain and lock, a bolt and nut, etc. Further, the at least one immobile object 1504 may include a post, a tree, etc.

Figure 16:
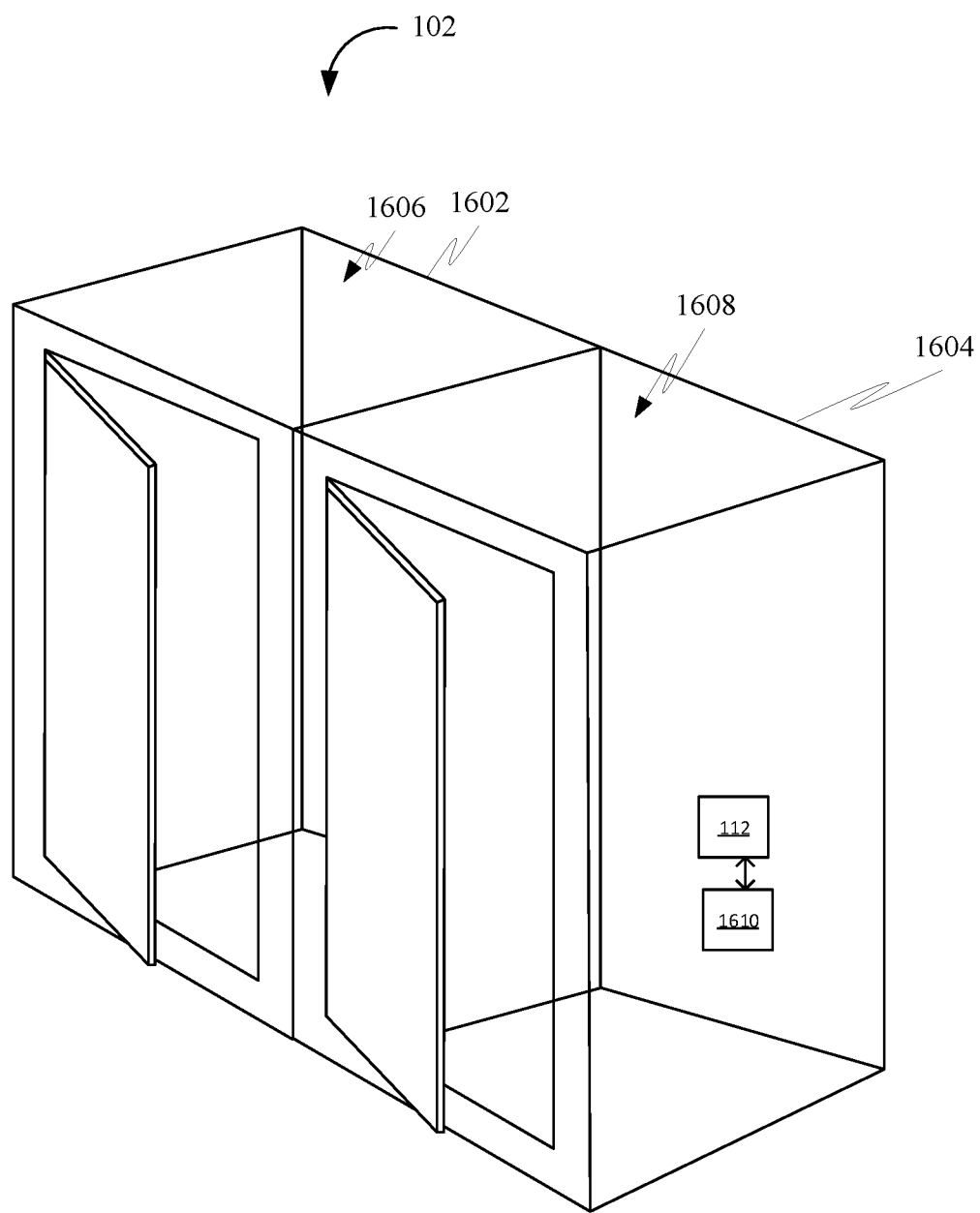
FIG. 16 is a schematic of the apparatus for facilitating safe deliveries of packages, in accordance with some embodiments.

Further, in some embodiments, the at least one container 102 may include a plurality of containers 1602-1604 (as shown in FIG. 16). Further, the plurality of containers 1602-1604 may be clustered. Further, each of the plurality of containers 1602-1604 may be configured for storing a package in an interior space (1606 and 1608) (as shown in FIG. 16) of each of the plurality of containers 1602-1604. Further, each of the plurality of containers 1602-1604 may be associated with an occupancy status corresponding to a presence of the package in the interior space (1606 and 1608). Further, the occupancy status corresponds to a presence and an absence of the package. Further, the apparatus 100 may include a storage device 1610 (as shown in FIG. 16) communicatively coupled with the processing device 112. Further, the storage device 1610 may be configured for retrieving the occupancy status of each of the plurality of containers 1602-1604. Further, the processing device 112 may be configured for analyzing the occupancy status of each of the plurality of containers 1602-1604. Further, the processing device 112 may be configured for identifying one of the plurality of containers 1602-1604 based on the analyzing of the occupancy status. Further, the generating of the at least one first sensor data may be based on detecting at least one common identifier associated with the package. Further, the at least one first sensor data may include the at least one common identifier. Further, the authenticating of the at least one package may include authenticating the package for the delivering of the package based on the analyzing of the at least one first sensor data. Further, the generating of the at least one first command may include generating the at least one first command for allowing disposing of the package in the interior space (1606 and 1608) of one of the plurality of containers 1602-1604 based on the authenticating of the package and the identifying one of the plurality of containers 1602-1604. Further, the generating of the at least one second sensor data may be based on detecting the at least one common identifier associated with the at least one package. Further, the generating of the at least one second command may include generating the at least one second command for allowing the retrieving of the package from the interior space (1606 and 1608) of one of the plurality of containers 1602-1604 based on the authenticating of the at least one user.

Figure 17:
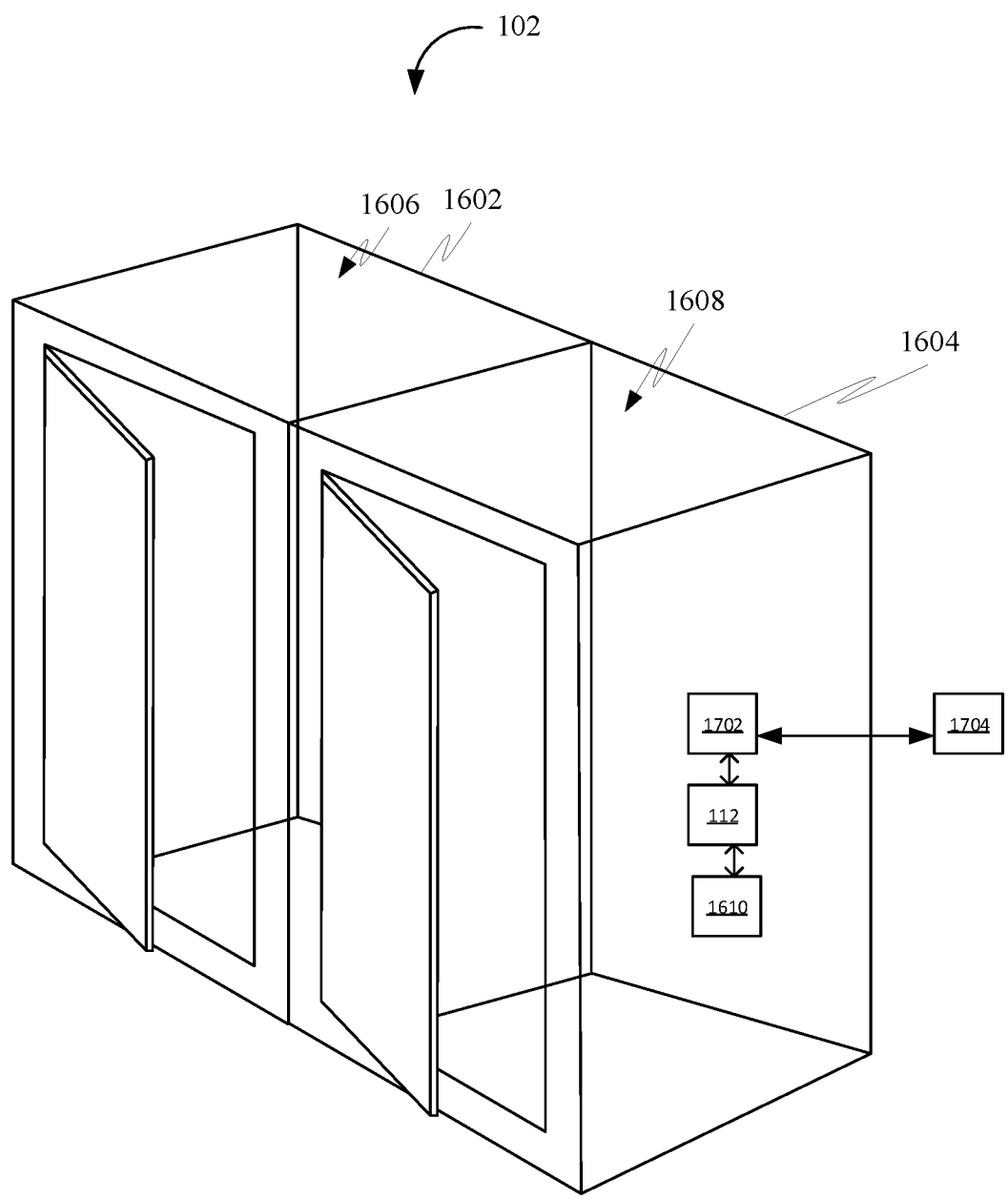
FIG. 17 is a schematic of the apparatus for facilitating safe deliveries of packages, in accordance with some embodiments.

Further, in an embodiment, the storage device 1610 may be configured for retrieving at least one historical occupancy data of a historical occupancy of the plurality of containers. Further, the processing device 112 may be configured for analyzing the at least one historical occupancy data. Further, the processing device 112 may be configured for determining a demand of the safe delivery of the packages based on the analyzing of the at least one historical occupancy data. Further, the processing device 112 may be configured for determining a number of containers required to manage the demand based on the determining of the demand. Further, the processing device 112 may be configured for generating a notification of the number of containers based on the determining of the number of containers. Further, a communication device 1702, as shown in FIG. 17, may be communicatively coupled with the processing device 112. Further, the communication device 1702 may be configured for transmitting the notification to at least one user device 1704, as shown in FIG. 17. Further, at least a number of containers is at least one of added and removed from the plurality of containers corresponding to the number of containers required to manage the demand.

FIG. 2 is a schematic of the apparatus 100 for facilitating safe deliveries of packages, in accordance with some embodiments.

FIG. 3 is a schematic of the apparatus 100 for facilitating safe deliveries of packages, in accordance with some embodiments.

FIG. 4 is a schematic of the apparatus 100 for facilitating safe deliveries of packages, in accordance with some embodiments.

FIG. 5 is a schematic of the apparatus 100 for facilitating safe deliveries of packages, in accordance with some embodiments.

FIG. 6 is a schematic of the apparatus 100 for facilitating safe deliveries of packages, in accordance with some embodiments.

FIG. 7 is a schematic of the apparatus 100 for facilitating safe deliveries of packages, in accordance with some embodiments.

FIG. 8 is a schematic of the apparatus 100 for facilitating safe deliveries of packages, in accordance with some embodiments.

FIG. 9 is a schematic of the apparatus 100 for facilitating safe deliveries of packages, in accordance with some embodiments.

FIG. 10 is a schematic of the apparatus 100 for facilitating safe deliveries of packages, in accordance with some embodiments.

FIG. 11 is a schematic of the apparatus 100 for facilitating safe deliveries of packages, in accordance with some embodiments.

FIG. 12 is a schematic of the apparatus 100 for facilitating safe deliveries of packages, in accordance with some embodiments.

FIG. 13 is a schematic of the apparatus 100 for facilitating safe deliveries of packages, in accordance with some embodiments.

FIG. 14 is a schematic of the apparatus 100 for facilitating safe deliveries of packages, in accordance with some embodiments.

FIG. 15 is a schematic of the apparatus 100 for facilitating safe deliveries of packages, in accordance with some embodiments.

FIG. 16 is a schematic of the apparatus 100 for facilitating safe deliveries of packages, in accordance with some embodiments.

FIG. 17 is a schematic of the apparatus 100 for facilitating safe deliveries of packages, in accordance with some embodiments.

Figure 18:
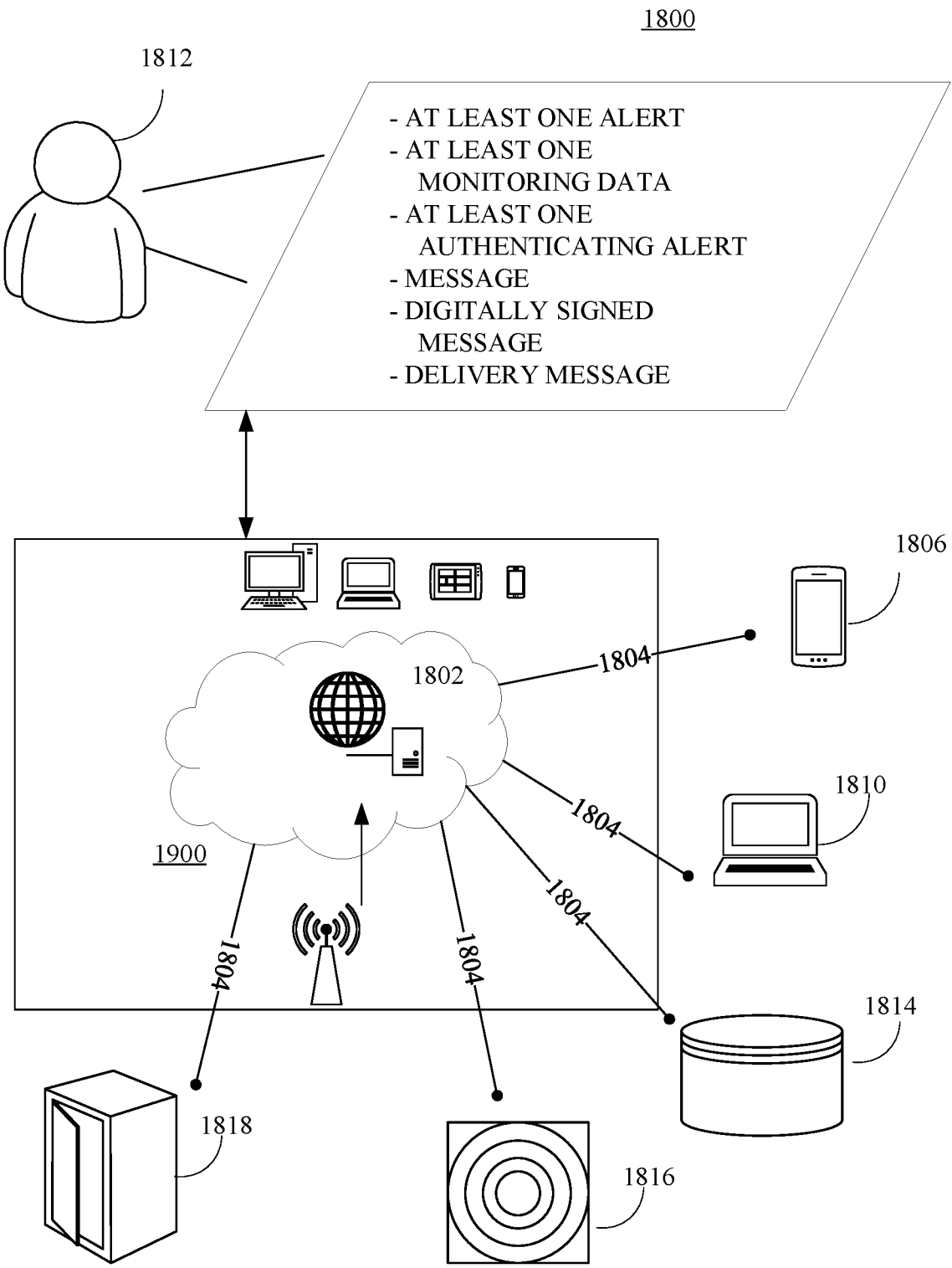
FIG. 18 is an illustration of an online platform consistent with various embodiments of the present disclosure.

FIG. 18 is an illustration of an online platform 1800 consistent with various embodiments of the present disclosure. By way of non-limiting example, the online platform 1800 for facilitating safe deliveries of packages may be hosted on a centralized server 1802, such as, for example, a cloud computing service. The centralized server 1802 may communicate with other network entities, such as, for example, a mobile device 1806 (such as a smartphone, a laptop, a tablet computer, etc.), other electronic devices 1810 (such as desktop computers, server computers etc.), databases 1814, sensors 1816, and an apparatus 1818 (such as the apparatus 100, the apparatus 1700, etc.) over a communication network 1804, such as, but not limited to, the Internet. Further, users of the online platform 1800 may include relevant parties such as, but not limited to, end-users, administrators, service providers, service consumers and so on. Accordingly, in some instances, electronic devices operated by the one or more relevant parties may be in communication with the platform.

A user 1812, such as the one or more relevant parties, may access online platform 1800 through a web based software application or browser. The web based software application may be embodied as, for example, but not be limited to, a website, a web application, a desktop application, and a mobile application compatible with a computing device 1900.

Figure 19:
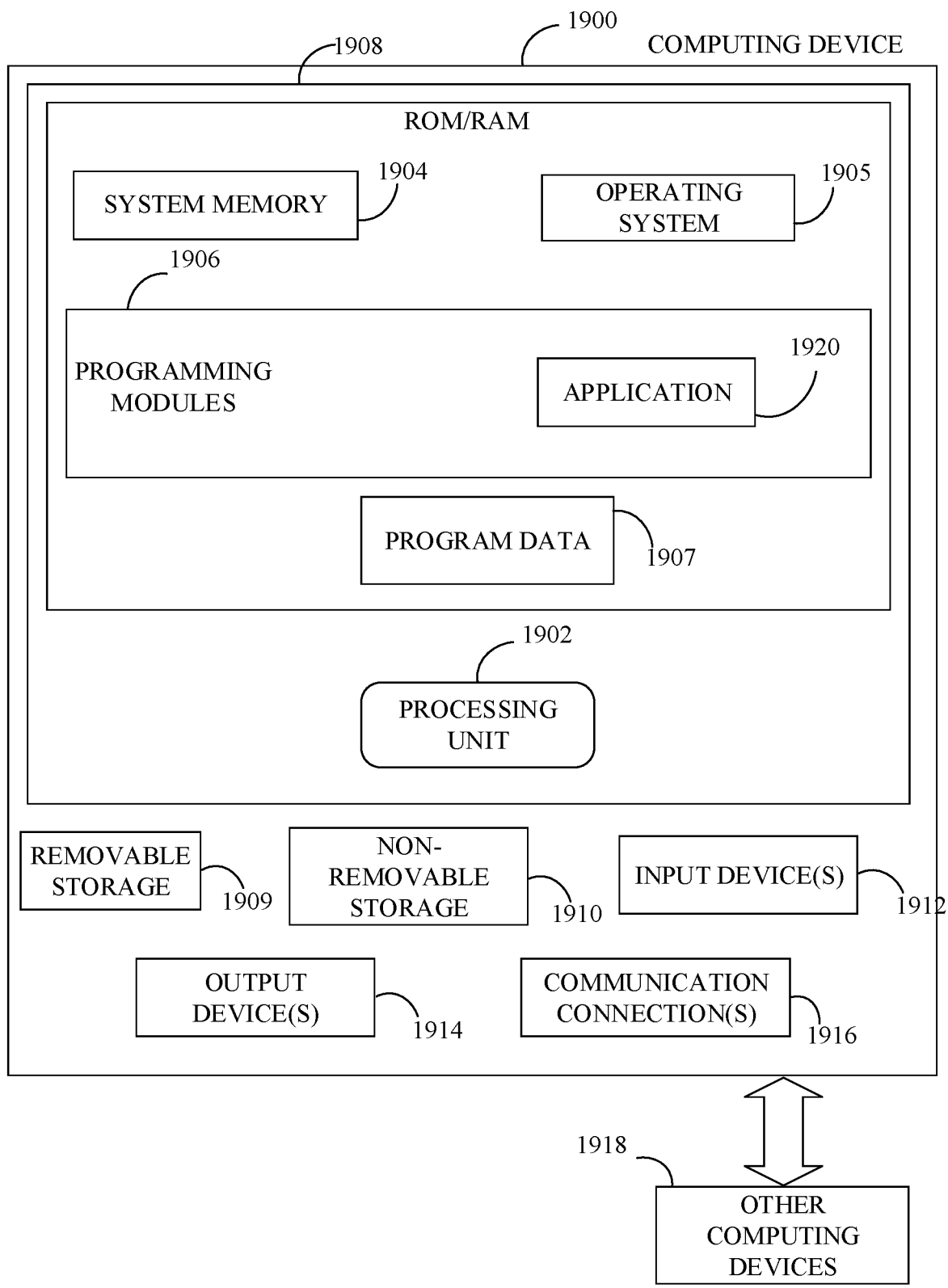
FIG. 19 is a block diagram of a computing device for implementing the methods disclosed herein, in accordance with some embodiments.

With reference to FIG. 19, a system consistent with an embodiment of the disclosure may include a computing device or cloud service, such as computing device 1900. In a basic configuration, computing device 1900 may include at least one processing unit 1902 and a system memory 1904. Depending on the configuration and type of computing device, system memory 1904 may comprise, but is not limited to, volatile (e.g. random-access memory (RAM)), non-volatile (e.g. read-only memory (ROM)), flash memory, or any combination. System memory 1904 may include operating system 1905, one or more programming modules 1906, and may include a program data 1907. Operating system 1905, for example, may be suitable for controlling computing device 1900's operation. In one embodiment, programming modules 1906 may include image-processing module, machine learning module. Furthermore, embodiments of the disclosure may be practiced in conjunction with a graphics library, other operating systems, or any other application program and is not limited to any particular application or system. This basic configuration is illustrated in FIG. 19 by those components within a dashed line 1908.

Computing device 1900 may have additional features or functionality. For example, computing device 1900 may also include additional data storage devices (removable and/or non-removable) such as, for example, magnetic disks, optical disks, or tape. Such additional storage is illustrated in FIG. 19 by a removable storage 1909 and a non-removable storage 1910. Computer storage media may include volatile and non-volatile, removable and non-removable media implemented in any method or technology for storage of information, such as computer-readable instructions, data structures, program modules, or other data. System memory 1904, removable storage 1909, and non-removable storage 1910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1900. Any such computer storage media may be part of device 1900. Computing device 1900 may also have input device(s) 1912 such as a keyboard, a mouse, a pen, a sound input device, a touch input device, a location sensor, a camera, a biometric sensor, etc. Output device(s) 1914 such as a display, speakers, a printer, etc. may also be included. The aforementioned devices are examples and others may be used.

Computing device 1900 may also contain a communication connection 1916 that may allow device 1900 to communicate with other computing devices 1918, such as over a network in a distributed computing environment, for example, an intranet or the Internet. Communication connection 1916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1904, including operating system 1905. While executing on processing unit 1902, programming modules 1906 (e.g., application 1920) may perform processes including, for example, one or more stages of methods, algorithms, systems, applications, servers, databases as described above. The aforementioned process is an example, and processing unit 1902 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, and fluidic technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 20:
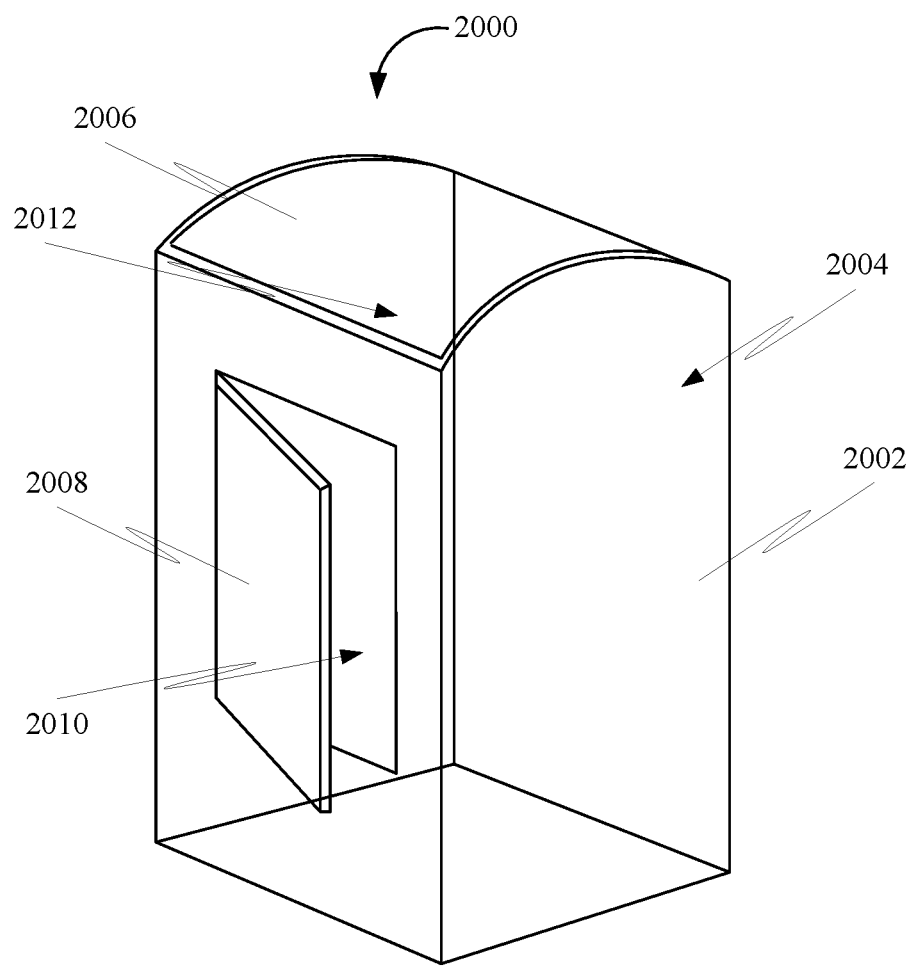
FIG. 20 is a schematic of an apparatus for facilitating safe deliveries of packages, in accordance with some embodiments.

FIG. 20 is a schematic of an apparatus 2000 for facilitating safe deliveries of packages, in accordance with some embodiments. Accordingly, the apparatus 2000 may include a container 2002. Further, the container 2002 may include an interior space 2004 and a first opening 2010 and a second opening 2018 leading into the interior space 2004. Further, the container 2002 may be configured for storing a package in the interior space 2004. Further, the package may include an item, an object, an article, a product, etc.

Figure 21:
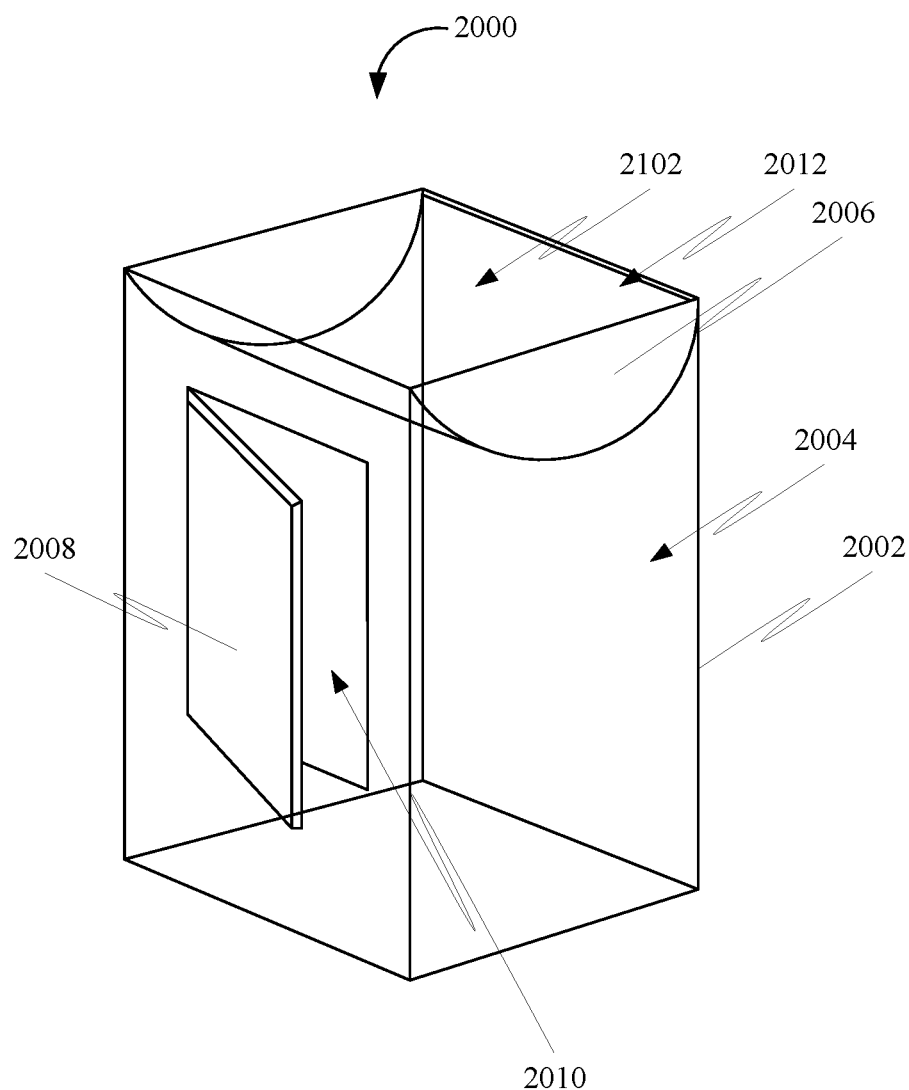
FIG. 21 is a schematic of the apparatus for facilitating safe deliveries of packages, in accordance with some embodiments.

Further, the container 2002 may include a first door 2008 coupled with the first opening 2010 and a second door 2006 coupled with the second opening 2012. Further, the first door 2008 may be transitionable between an open state and at least one closed state for openably closing the first opening 2010. Further, the first door 2008 allows retrieving of the package from the interior space 2004 through the first opening 2010 in the open state. Further, the first door 2008 prevents the retrieving of the package from the interior space 2004 through the first opening 2010 in the at least one closed state. Further, the second door 2006 may be a turnstile door. Further, the second door 2006 may be rotatable about an axis for transitioning between a first open state and at least one first closed state. Further, the second door 2006 in the at least one first opened state creates a temporary interior space 2102, as shown in FIG. 21, with the second opening 2012 leading into the temporary interior space 2102 within the interior space 2004 for disposing of the package in the temporary interior space 2102 through the second opening 2012 based on opening of the second door 2006. Further, the second door 2006 in the at least one closed state merges the temporary interior space 2102 with the interior space 2004 through the second opening 2012 allowing transferring of the package from the temporary interior space 2102 to the interior space 2004 based on closing of the second door 2006 after the opening of the second door 2006 and the disposing of the package in the temporary interior space 2102.

FIG. 21 is a schematic of the apparatus 2000 for facilitating safe deliveries of packages, in accordance with some embodiments. Although the present disclosure has been explained in relation to its preferred embodiment, it is to be understood that many other possible modifications and variations can be made without departing from the spirit and scope of the disclosure.

The following is claimed:
1. An apparatus for facilitating safe deliveries of packages, the apparatus comprising:
   at least one container, comprising;
      at least one interior space;
      at least one opening leading into the at least one interior space;
   the at least one container configured for storing at least one package in the at least one interior space;
   the at least one container comprising at least one door coupled with the at least one opening;
   the at least one door transitionable between an open state and at least one closed state for openably closing the at least one opening;
   the at least one door allowing retrievably disposing of the at least one package in the at least one interior space through the at least one opening in the open state;
   the at least one door preventing the retrievably disposing of the at least one package in the at least one interior space through the at least one opening in the at least one closed state;
   at least one sensor disposed on the at least one container, wherein the at least one sensor is configured for:
      generating at least one first sensor data, based on detecting at least one package identifier associated with the at least one package;
      the at least one first sensor data comprising the at least one package identifier;
      generating at least one second sensor data, based on detecting at least one user identifier associated with at least one user;
      the at least one user associated with the at least one package; the at least one second sensor data comprising the at least one user identifier;
   a processing device communicatively coupled with the at least one sensor, wherein the processing device is configured for:
      analyzing the at least one first sensor data;
      authenticating the at least one package for disposing of the at least one package in the at least one interior space based on the analyzing of the at least one first sensor data;
      generating at least one first command for allowing the disposing, based on the authenticating of the at least one package;
      analyzing the at least one second sensor data;
      authenticating the at least one user for retrieving the at least one package from the at least one interior space, based on the analyzing of the at least one second sensor data;
      generating at least one second command for allowing the retrieving, based on the authenticating of the at least one user; and
   at least one locking mechanism operationally coupled with the at least one door;
      the at least one locking mechanism communicatively coupled with the processing device;
      the at least one locking mechanism configured for transitioning between a locked state and an unlocked state;
      the at least one locking mechanism allowing transitioning of the at least one door from the at least one closed state to the open state in the unlocked state;
      the at least one locking mechanism preventing the transitioning of the at least one door from the at least one closed state to the open state in the locked state;
      the at least one locking mechanism configured for transitioning from the locked state to the unlocked state, based on the at least one first command; and
      the at least one locking mechanism configured for transitioning from the locked state to the unlocked state, based on the at least one second command;
   wherein:
   the at least one interior space comprises a first interior space and a second interior space;
   the at least one opening comprising a first opening leading into the first interior space and a second opening leading into the second interior space;
   the at least one door comprising a first door coupled with the first opening and a second door coupled with the second opening;
   the first door transitionable between the open state and the at least one closed state for openably closing the first opening and the second door is transitionable between the open state and the at least one closed state for openably closing the second opening;
   the first door allowing disposing of the at least one package in the first interior space through the first opening in the open state;
   the first door preventing the disposing of the at least one package in the first interior space through the first opening in the at least one closed state;
   the second door allowing retrieving of the at least one package from the second interior space through the second opening in the open state;
   the second door preventing the retrieving of the at least one package in the second interior space through the second opening in the at least one closed state;
   the at least one locking mechanism comprising a first locking mechanism and a second locking mechanism;
   the first locking mechanism operationally coupled with the first door and the second locking mechanism operationally coupled with the second door; and
   the first locking mechanism transitions from the locked state to the unlocked state, based on the at least one first command and the second locking mechanism transitions from the locked state to the unlocked state, based on the at least one second command;
   wherein:
   the at least one container further comprises an inner opening;
   the first interior space is coupled with the second interior space through the inner opening;
   the at least one package disposed in the first interior space is transferred to the second interior space through the inner opening;
   the first interior space accessible through the first opening for allowing the disposing of the at least one package into the first interior space through the first opening in the open state; and
   the second interior space inaccessible from the first opening for preventing the retrieving of the at least one package from the second interior space through the first opening in the open state.
2. The apparatus for facilitating safe deliveries of packages of claim 1, further comprising:
   an inner door configured for transitioning between a closed door state and at least one open door state for openably closing the inner opening, based on transitioning the first door between the open state and the at least one closed state;
the inner door transitions from the at least one open door state to the closed door state for closing the inner opening based on the transitioning of the first door from the at least one closed state to the open state for restricting an access to the second interior space from the first interior space through the inner opening; and
wherein the preventing of the retrieving of the at least one package from the second interior space through the first opening in the open state is further based on the restricting of the access to the second interior space from the first interior space through the inner opening.

3. The apparatus for facilitating safe deliveries of packages of claim 2, further comprising a light blocking member comprised in the inner door;
the light blocking member configured for blocking a visibility of the second interior space through the inner opening from the first interior space.

4. The apparatus for facilitating safe deliveries of packages of claim 1, further comprising:
a storage device communicatively coupled with the processing device;
the storage device configured for retrieving at least one authorized package identifier associated with at least one authorized package expected to be delivered using the apparatus based on the analyzing of the at least one first sensor data;
wherein the processing device is further configured for:
comparing the at least one package identifier with the at least one authorized package identifier;
determining a match between the at least one package identifier and the at least one authorized package identifier based on the comparing; and
the authenticating of the at least one package is further based on the determining of the match between the at least one package identifier and the at least one authorized package identifier.

5. The apparatus for facilitating safe deliveries of packages of claim 4, wherein the retrieving of the at least one authorized package identifier associated with the at least one authorized package comprising retrieving the at least one authorized package identifier associated with the at least one authorized package from a distributed ledger.

6. The apparatus for facilitating safe deliveries of packages of claim 4, further comprising:
a communication device communicatively coupled with the storage device;
the communication device is configured for receiving the at least one authorized package identifier associated with the at least one authorized package from at least one first device;
the storage device is further configured for storing the at least one authorized package identifier associated with the at least one authorized package; and
the retrieving of the at least one authorized package identifier associated with the at least one authorized package is further based on the storing.

7. The apparatus for facilitating safe deliveries of packages of claim 1 further comprising:
at least one monitoring device disposed on the at least one container;
the at least one monitoring device is configured for generating at least one monitoring data based on monitoring at least one object present in a vicinity of the apparatus;
the processing device is communicatively coupled with the at least one monitoring device;
the processing device is further configured for:
analyzing the at least one monitoring data using at least one machine learning model;
determining at least one event associated with the apparatus based on the analyzing of the at least one monitoring data;
generating at least one alert of the at least one event based on the determining of the at least one event, wherein the at least one alert comprises the at least one event;
a communication device communicatively coupled with the processing device; and
the communication device is configured for transmitting the at least one alert and the at least one monitoring data to at least one second device.

8. The apparatus for facilitating safe deliveries of packages of claim 1, wherein the processing device is further configured for generating at least one authentication information associated with an authentication of the at least one user based on the authenticating of the at least one user; the processing device is communicatively coupled with a storage device; and the storage device is configured for storing the at least one authentication information.

9. The apparatus for facilitating safe deliveries of packages of claim 8, wherein the storage device is further configured for retrieving at least one historical authentication information associated with at least one historical authentication of the at least one user;
the processing device is further configured for:
analyzing the at least one authentication information and the at least one historical authentication information using at least one first machine learning model;
determining at least one authenticating event associated with the at least one user based on the analyzing of the at least one authentication information and the at least one historical authentication information;
generating at least one authenticating alert of the at least one authenticating event based on the determining of the at least one authenticating event;
the at least one authenticating alert comprising the at least one authenticating event;
the processing device communicatively coupled with a communication device; and
the communication device configured for transmitting the at least one authenticating alert to at least one third device.

10. The apparatus for facilitating safe deliveries of packages of claim 1 further comprising:
a storage device communicatively coupled with the processing device;
the storage device configured for retrieving at least one authorized user identifier associated with at least one authorized user based on the analyzing of the at least one second sensor data;
the processing device further configured for:
comparing the at least one user identifier with the at least one authorized user identifier;
determining a match between the at least one user identifier and the at least one authorized user identifier based on the comparing of the at least one user identifier with the at least one authorized user identifier; and the authenticating of the at least one user is further based on the determining of the match between the at least one user identifier and the at least one authorized package identifier.

11. The apparatus for facilitating safe deliveries of packages of claim 10, further comprising:
a communication device communicatively coupled with the storage device;
the communication device is configured for receiving the at least one authorized user identifier associated with the at least one authorized user from at least one fourth device;
the storage device is further configured for storing the at least one authorized user identifier associated with the at least one authorized user; and
the retrieving of the at least one authorized user identifier associated with the at least one authorized user is further based on the storing of the at least one authorized user identifier.

12. An apparatus for facilitating safe deliveries of packages, the apparatus comprising:
at least one container, comprising;
at least one interior space;
at least one opening leading into the at least one interior space;
the at least one container configured for storing at least one package in the at least one interior space;
the at least one container comprising at least one door coupled with the at least one opening;
the at least one door transitionable between an open state and at least one closed state for openably closing the at least one opening;
the at least one door allowing retrievably disposing of the at least one package in the at least one interior space through the at least one opening in the open state;
the at least one door preventing the retrievably disposing of the at least one package in the at least one interior space through the at least one opening in the at least one closed state;
at least one sensor disposed on the at least one container, wherein the at least one sensor is configured for:
generating at least one first sensor data, based on detecting at least one package identifier associated with the at least one package;
the at least one first sensor data comprising the at least one package identifier;
generating at least one second sensor data, based on detecting at least one user identifier associated with at least one user;
the at least one user associated with the at least one package; the at least one second sensor data comprising the at least one user identifier;
a processing device communicatively coupled with the at least one sensor, wherein the processing device is configured for:
analyzing the at least one first sensor data;
authenticating the at least one package for disposing of the at least one package in the at least one interior space based on the analyzing of the at least one first sensor data;
generating at least one first command for allowing the disposing, based on the authenticating of the at least one package;
analyzing the at least one second sensor data;
authenticating the at least one user for retrieving the at least one package from the at least one interior space, based on the analyzing of the at least one second sensor data;
generating at least one second command for allowing the retrieving, based on the authenticating of the at least one user; and
at least one locking mechanism operationally coupled with the at least one door;
the at least one locking mechanism communicatively coupled with the processing device;
the at least one locking mechanism configured for transitioning between a locked state and an unlocked state;
the at least one locking mechanism allowing transitioning of the at least one door from the at least one closed state to the open state in the unlocked state;
the at least one locking mechanism preventing the transitioning of the at least one door from the at least one closed state to the open state in the locked state;
the at least one locking mechanism configured for transitioning from the locked state to the unlocked state, based on the at least one first command; and
the at least one locking mechanism configured for transitioning from the locked state to the unlocked state, based on the at least one second command;
wherein:
the at least one package disposed in the first interior space is transferred to the second interior space through the inner opening;
the first interior space accessible through the first opening and the second interior space inaccessible from the first opening;
at least one third sensor disposed on the at least one container;
the at least one third sensor is configured for generating at least one third sensor data associated with the at least one container;
the processing device is communicatively coupled with the at least one third sensor;
wherein the processing device is further configured for:
analyzing the at least one third sensor data;
determining a presence of the at least one package in the at least one interior space based on the analyzing of the at least one third sensor data;
generating a message of a delivery of the at least one package based on the determining of the presence of the at least one package;
signing the message of the delivery digitally using a private key associated with the at least one user;
the private key associated with a private and public key pair;
generating a digitally signed message of the delivery based on the signing of the message;
the digitally signed message is accessible by a public key of the private and public key pair; and
a communication device communicatively coupled with the processing device;
the communication device is configured for:
transmitting the digitally signed message to at least one fifth device.

13. The apparatus for facilitating safe deliveries of packages of claim 1, wherein the processing device is further configured for:

determining at least one delivery event based on at least one of the detecting of the at least one package identifier, the detecting of the at least one user identifier, the generating of the at least one first command, and the generating of the at least one second command;

generating a delivery message of the at least one delivery event based on the determining of the at least one delivery event;

the processing device is communicatively coupled with a communication device; and the communication device is configured for transmitting the delivery message to at least one user device.

14. The apparatus for facilitating safe deliveries of packages of claim 13, further comprising:

at least one fourth sensor disposed on the at least one container;

the at least one fourth sensor configured for generating at least one fourth sensor data based on detecting at least one communication operation of the communication device;

the processing device communicatively coupled with the at least one fourth sensor;

the processing device further configured for:
analyzing the at least one fourth sensor data;
determining a status of the communication device based on the analyzing of the at least one fourth sensor data;
generating at least one sensor command for the at least one sensor based on the determining of the status;
wherein the at least one sensor is configured for transitioning from an enabled state to a disabled state based on the at least one sensor command;
at least one of the detecting of the at least one package identifier associated with the at least one package and the detecting of the at least one user identifier associated with at least one user is performed in the enabled state; and
at least one of the detecting of at least one package identifier associated with the at least one package and the detecting of the at least one user identifier associated with at least one user is not performed in the disabled state.

15. The apparatus for facilitating safe deliveries of packages of claim 1, further comprising at least one securing element attached to the at least one container, the at least one securing element configured for securing the apparatus to at least one immobile object.

16. The apparatus for facilitating safe deliveries of packages of claim 1, wherein the at least one container comprises a plurality of containers;

wherein each of the plurality of containers is configured for storing a package in an interior space of each of the plurality of containers;

each of the plurality of containers is associated with an occupancy status corresponding to a presence of the package in the interior space;

the apparatus further comprising a storage device communicatively coupled with the processing device;

the storage device configured for retrieving the occupancy status of each of the plurality of containers;

the processing device configured for:
analyzing the occupancy status of each of the plurality of containers;
identifying one of the plurality of containers based on the analyzing of the occupancy status;

wherein the generating of the at least one first sensor data is further based on detecting at least one common identifier associated with the package;

the at least one first sensor data further comprising the at least one common identifier;

the authenticating of the at least one package comprising authenticating the package for the delivering of the package based on the analyzing of the at least one first sensor data;

the generating of the at least one first command comprising generating the at least one first command for allowing disposing of the package in the interior space of one of the plurality of containers based on the authenticating of the package and the identifying one of the plurality of containers;

the generating of the at least one second sensor data further based on detecting the at least one common identifier associated with the at least one package;

the generating of the at least one second command comprising generating the at least one second command for allowing the retrieving of the package from the interior space of one of the plurality of containers based on the authenticating of the at least one user.

17. The apparatus for facilitating safe deliveries of packages of claim 16, wherein the storage device is configured for retrieving at least one historical occupancy data of a historical occupancy of the plurality of containers, wherein the processing device is further configured for:

analyzing the at least one historical occupancy data;
determining a demand of the safe delivery of the packages based on the analyzing of the at least one historical occupancy data;
determining a number of containers required to manage the demand based on the determining of the demand;
generating a notification of the number of containers based on the determining of the number of containers, wherein a communication device is communicatively coupled with the processing device, wherein the communication device is configured for transmitting the notification to at least one user device, wherein at least a number of containers is at least one of added and removed from the plurality of containers corresponding to the number of containers required to manage the demand.

* * * * *